(12) United States Patent
McWhirk

(10) Patent No.: US 8,157,205 B2
(45) Date of Patent: Apr. 17, 2012

(54) MULTIBODY AIRCRANE

(76) Inventor: Bruce Kimberly McWhirk, Brookline, MA (US)

( * ) Notice: Subject to any disclaimer, the term of this patent is extended or adjusted under 35 U.S.C. 154(b) by 1083 days.

(21) Appl. No.: 11/713,493

(22) Filed: Mar. 2, 2007

(65) Prior Publication Data
US 2009/0152391 A1    Jun. 18, 2009

Related U.S. Application Data

(60) Provisional application No. 60/778,988, filed on Mar. 4, 2006.

(51) Int. Cl.
*B64B 1/06* (2006.01)
(52) U.S. Cl. ............... 244/30; 244/25; 244/26; 212/274
(58) Field of Classification Search ............ 244/30, 244/25, 26, 29; 212/274, 272, 275
See application file for complete search history.

(56) References Cited

U.S. PATENT DOCUMENTS

| | | | |
|---|---|---|---|
| 4,482,110 A * | 11/1984 | Crimmins, Jr. | 244/26 |
| 5,026,003 A * | 6/1991 | Smith | 244/26 |
| 5,096,141 A * | 3/1992 | Schley | 244/25 |
| 5,507,596 A * | 4/1996 | Bostelman et al. | 405/191 |
| 6,439,407 B1 * | 8/2002 | Jacoff et al. | 212/274 |
| 2002/0144967 A1 * | 10/2002 | Jacoff et al. | 212/274 |
| 2007/0102571 A1 * | 5/2007 | Colting | 244/30 |
| 2009/0066100 A1 * | 3/2009 | Bosscher et al. | 294/86.4 |
| 2009/0078818 A1 * | 3/2009 | Zulkowski et al. | 244/30 |

* cited by examiner

*Primary Examiner* — Christopher P Ellis
(74) *Attorney, Agent, or Firm* — Kristina M. Grasso, Esq. PLLC

(57) ABSTRACT

This invention performs relative positioning, predictive control, and ballast control to achieve very heavy-lifting tasks on land or sea. Such tasks allow station keeping and precise transfer of very heavy payloads between ships underway. This scalable multibody system features three subcomponents: Airship, Skycrane and Loadframe. This semi-autonomous system combines aerodynamic (kinetic) and aerostatic (buoyancy force) lift with efficient power and propulsion. During low-speed flight, the Airship and Skycrane are decoupled but linked via a reelable Tether Control Line. Beneath the Skycrane, centered on its hull, a patented NIST (National Institute of Standards and Technology) RoboCrane, featuring a computer controlled six degrees of freedom (DoF) cabling system, is attached, to precisely suspend and control a Loadframe, with or without payload. During subsonic forward flight, these Airship and Skycrane are coupled as a single airframe: fuselage and delta wing.

17 Claims, 10 Drawing Sheets

MULTIBODY AIRCRANE

CROSS-REFERENCE TO RELATED APPLICATIONS

The present application may include subject matter related to one or more of the following commonly-owned United States patent applications, each of which was filed on even date herewith, claims benefit of, and is hereby incorporated herein by reference in its entirety: U.S. Patent Application Ser. No. 60/778,988 filed Mar. 4, 2006.

TECHNICAL FIELD

This invention relates to airships, specifically airships which are used for very heavy lifting.

BACKGROUND

Heavy lift lighter-than-air vehicles have been designed in recent years, owing largely to advances in high-strength fabric and composite materials, computerized flight control systems, propulsion systems and new fabrication techniques.

Throughout aviation history, the performance of very heavy lift by an air platform, i.e. the ability to lift a gross payload weight in excess of 250 tons via an air platform, long has been considered the exclusive domain of airships. The first significant heavy lift Airship design dates back to the 1.929 with the (U.S. Navy's ZMC-3, a metal clad Airship designed to carry as much as 100 tons. But this airship was never built. The ZMC-3 airship's proposed dimensions were 618 feet in length, and 154.5 feet in diameter. It was to carry 7,400,000 cubic feet of helium, with a gross lift of 212.5 tons, and a useful lift of 140.75 tons. Minus the weight of crew, spare parts and ballast, this airship was to have had a 100-ton capacity for cargo (more cargo lifting capacity than a present-day Air Force C-5A Galaxy). The ZMC-2's (its built predecessor) and known by sailors as the "Tin Bubble" advanced aeronautics technology, specifically the welding method to put together its aluminum envelope, that provided the American aeronautics industry with the industrial technology for fuselage assembly for U.S. warplanes during World War II.

On Jan. 31, 2006, Lockheed Martin's Skunk Works made the first flight of its "P-791" test bed at its facility on the Palmdale Air Force Plant 42 airport. The company did not announce or publicly discuss the flight. The P-791 is part of an independent research and development project to better understand airship capabilities and technologies, such as materials, Lockheed Martin officials say. The P-791 appears similar to the proposed full-scale version of the British Sky-Kitten, called the SkyCat. It may also be a quarter-scale prototype of this heavy-lifter, a hybrid airship envisioned with a 1000-ton payload capacity. Both airships have similar overall shapes, though the Skunk Works design is wider, and similar propulsion layouts, and both use air cushion landing gear. Perhaps the two programs have people in common. One of the partner names on the side of the P-791 is TCOM, an American manufacturer of aerostats and envelopes for airships. In the U.K., Mr. Roger Munk's Advanced Technologies Group (ATG) at Cardington, England built a 40-ft.-long unmanned SkyKitten (a smaller prototype of its Skycat) and flew it in 2000. The P-791 is a proof-of-principle vehicle to help engineers learn more about technology and aerodynamics for such airships.

But the P-791 is a unique platform that uses four air cushions located on its outer lobes as landing gear. Most of its lift comes from being filled with a lighter-than-air gas such as helium. But overall, it is heavier than air and gains the final 20% or so of lift by flying like an aircraft. The vehicle behaves like a flying hovercraft, except one with greater exposure to winds. During landing operations, the air cushions can be reversed to suck the aircraft onto the ground to resist winds for cargo operations. Air pressure also may be used to spread landing loads into the inflatable structure. Because the P-791 relies on air cushions it is completely ill suited for ship-to-ship at sea material transfer operations, since its huge downdrafts or updrafts would upset deck safety by generating venturi effects and FOD (foreign objects debris). Moreover, the P-791 lacks any external suspended loadframe with payload to safely land a ship's cargo deck or reach into a deep cargo holds. In sum, this airship with an internal cargo bay, is much too huge to land anywhere on a ship's deck.

In recent years, WALRUS, a heavier than air vehicle that utilizes heliLmi for buoyancy lift, has been designed to deliver a 500-1000 ton payload, was funded by DARPA for U.S. military applications. The WALRUS system is defined as a global airlift capability to deliver a brigade-size logistics payload over 12,000 nautical miles (nm) purportedly in fewer than 7 days from the continental U.S. (CONUS) "to unimproved landing sites and maritime environments". In 2005, DARPA awarded Aeros Aeronautical Systems, a division of Worldwide Aeros, a 12-month $3,267,000 contract for phase I and awarded Lockheed Martin's Skunk Works a $2,989,779 contract for phase 1. WALRUS program manager Phil Hunt said: "This is not an airship. This is a heavier-than-air vehicle."

The first critical challenge of WALRUS is the control of lift, which is to be generated in multiple ways. Much of the lift would be provided by lighter than air gas, such as helium, which could be superheated to increase buoyancy for take-off and supercooled for landing. "If we raise the temperature 35° C., we get an extra 15% lift," Hunt said. Other ways of controlling buoyancy include ballonets inside the envelope, which can be filled with offboard air and then superheated or supercooled.

The second source of lift for WALRUS would be the aircraft's body and aerodynamic surfaces such as canards. "Techniques to change aerodynamic lift and reduce boundary-layer drag will be required", said Hunt. The third source will be direct lift, either by vectoring the propulsion engines or by embedding thrusters in the airframe. "Each lift-producing mechanism has a different frequency of response, and they must be integrated to provide a "fly and forget" control system," Hunt said.

More to the point, the WALRUS design is entirely ill suited for at sea cargo transfer operations, i.e. point to point transfer of very heavy payloads between ships underway or from ships to onshore facilities such as port or intermodal terminals and barges in a coastal or riverine environment. Having no suspended loadframe (with computerized rigging and stable platform to carry very heavy payloads over a target area for precise load on/load off) and being a heavier-than air aircraft measuring over 1,000 ft. in length, it would be far too long and dangerous to avoid ramming ship's superstructure. Being too big and bulky with no suspended loadframe, WALRUS is ill-suited for at-sea material transfer of very heavy cargoes.

Autonomous robotic airships were successfully designed and developed in the 1990s. The most important and integrated research and development related to unmanned, autonomous airships is the project AURORA, led by the Automation Institute of the Informatics Technology Center in Brazil. Other labs, particularly in France, have considered some particular problems related to airship autonomy, considering essentially the lowest level functionalities from a control theory point of view.

In the late 1990s, CargoLifter, a German cargo company, sought to fly off with a share of the estimated US $9 billion-a-year market in oversize cargo. CargoLifter spent millions of deutschmarks, mostly provided by the state of Brandenburg, in designing an advanced helium airship. But Cargolifter's CL75 and the larger version, the CL160, despite many technical innovations, both had a serious design flaw: they required water ballast. Active ballast control, therefore, was the greatest limiting factor to CargoLifter's airship operation.

CargoLifter designed two airships: the CL75 and CL160 (designed by the German company to carry 75 tons and 160 tons of cargo respectively). A prototype of the CL-75 was built: it was a single balloon with a diameter of 61 meters.

CargoLifter's CL160 was designed to haul up to 160 tons, around the weight of a Boeing 747, for a fraction of the cost of air freight and 10 times faster than the land and sea alternatives. CargoLifter was organized by Baron Carl von Gablenz. CargoLifter eventually went into receivership.

But the CL160 was never intended to perform point-to-point transfer of very heavy cargo at sea between ships underway. Today, Zeppelin has acquired the intellectual property of the now defunct CargoLifter organization. It will become part of a new Lighter-Than-Air Institute, headquartered in Friedrichshafen, for coordinating activities on scientific and predevelopment levels applicable to all types of airships.

Limiting the operational "footprint" of these ultra-large airships (ULAs) is a key issue. With the exception of the CL-160, that has a suspended external loadframe, all the mentioned ULAs have internal cargo bays to transport their cargo. This means that very heavy payloads must be loaded or offloaded from these heavy lift vehicles at super-size landing fields with level, stable surface of several hundred yards in length. Because they require a very large operational footprint, these ULAs are ill-suited for logistics operations in a compact area, like those required in Arctic Oil & Gas upstream operations or for cargo ships operating to and from a sea base. Indeed, none of the aforementioned heavy lift inflatables have been specifically designed to perform the in-air transfer of very heavy payloads between ships underway at sea.

The U.S. Navy currently transfers heavy payloads between ships underway by heavy lift helicopters such as the CH53E. But rotorcraft have limited payload lifting capacity. Typically, these "heavy lift" helicopters carry their loads on cables or "slings" extending beneath the fuselage of the aircraft. U.S. Marine Corp pilots who fly CH53E heavy lift helicopters complain that the suspended payload of 18 tons has a tendency "to fly itself" due to forward motion and downwash and other oscillations that produce a "springing effect". Under adverse conditions of high wind or high sea states, suspended heavy payloads tend to become unmanageable due to cushioning effects and venturi reactions. The cruising speeds of such helicopters are also severely restricted by the externally slung, often low density, high drag loads. Dangerous load oscillations often develop as a result of load inertia and/or movements during flight. Such oscillations may result in load jettisoning or disastrous loss of flight control. Other hybrid rotorcraft, like the V-22 Osprey, a quad-tilt rotor design, while being able to vertically land and take off (VTOL) from flight decks, also has limited payload lifting capacity of about 20 tons.

The SkyCat operates as an independent platform. It can set down on sea if the winds and waves make it calm as glass. But it's too massive to set down on the deck of a moving ship and navigate around that ship's superstructure, in order to avoid collision, and its cargoes are stored inside the vehicle, rather than being suspended from above. In short it has no workable aircrane with suspended load mechanism for rapid payload transfer from ship to ship.

CargoLifter's CL160, intended to carry 160 tons of cargo may not be as radical a design as the SkyCat, but it was still a contender for the title of biggest aircraft ever constructed. At 260 meters, its design was 15 meters longer than the Hindenburg, which still holds the record. Like the SkyCat, the CL160 was to have a central keel and no internal frame. The keel, to be built from composites, would house a crew compartment, and, in the original design, support four 450-horsepower diesel engines and propellers, along with the cargo deck. Its designers saw the craft as a means to lift heavy and bulky items, such as generators and oil drilling equipment.

Both of these ultra large airships (ULAs) were tested by the U.S. Army in a wargame in 2001. The strategic ULA (SkyCat) immediately impacted the Vigilant Warriors 01 wargame with its ability to deliver a 750-short ton sustainment load, given the objective force's hand-to-mouth logistics capability. The requirement for at least a 3,000-toot open landing space, appropriate materials handling equipment, its size, and the fact that it is a civilian platform limited the ULA to certain locations. Floor restrictions on the aircraft limited cargo to lighter items such as helicopters, light vehicles, and sustainment stocks. It was, nonetheless, a valuable asset because of the amount of cargo it could deliver. The smaller, intratheater ULA (CL-75) could vertically deliver its cargo by hovering at approximately 100 meters and lowering its payload. The cost associated with the vertical discharge, however, was the requirement for a load exchange for ballast. In the wargame, ballast water was used, and this limited using CargoLifter's CL-75 to routes along the coast.

Active ballast control, therefore, was the greatest limiting factor to CargoLifter's airship operations.

SUMMARY

The present embodiment of the invention is designed to accomplish a multiplicity of very heavy-lifting tasks at sea or on land, but is principally intended for the at-sea transfer of very heavy payloads between ships underway with no special or additional equipment. Such applications may occur within a sea base or between a sea base and onshore intermodal terminals, such as ports or airports, or from a ship or offshore oil platform to riverboats or barges in riverways or ashore, or even further inland, to and from a specific landing point(s), etc. The present invention embodies a scalable, semi-autonomous lighter-than-air system, relying on helium for its buoyancy force, that operates as a flexible multibody system, featuring three distinct subcomponents (platforms): an Airship, Skycrane, and Loadframe. During low-speed flight in cargo transfer operations, the first two subcomponents, Airship and Skycrane, are decoupled, but linked via a reelable Tether Control Line. Underneath the Skycrane, centered along its hull, is attached a NIST RoboCrane, featuring a computer controlled six degrees of freedom (DoF) cabling system that precisely suspends and controls a Loadframe, with or without payload. In all, the present invention provides active relative positioning, predictive control and active ballast control to achieve precise and timely point to point transfer of very heavy cargoes, such as 53,000-60,000 pound ISO 20' containers, between containerships ships and other vessels or crafts underway at sea. During higher speed subsonic forward flight, these integrated sub-components are coupled together to form a single airframe, with fuselage and wing span. This configuration creates aerodynamic (kinetic) and aerostatic (buoyancy force) lift, with more efficient power and propulsion, and an airframe.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The invention description below refers to the accompanying drawings, of which.

DETAILED DESCRIPTION

Figure 1:
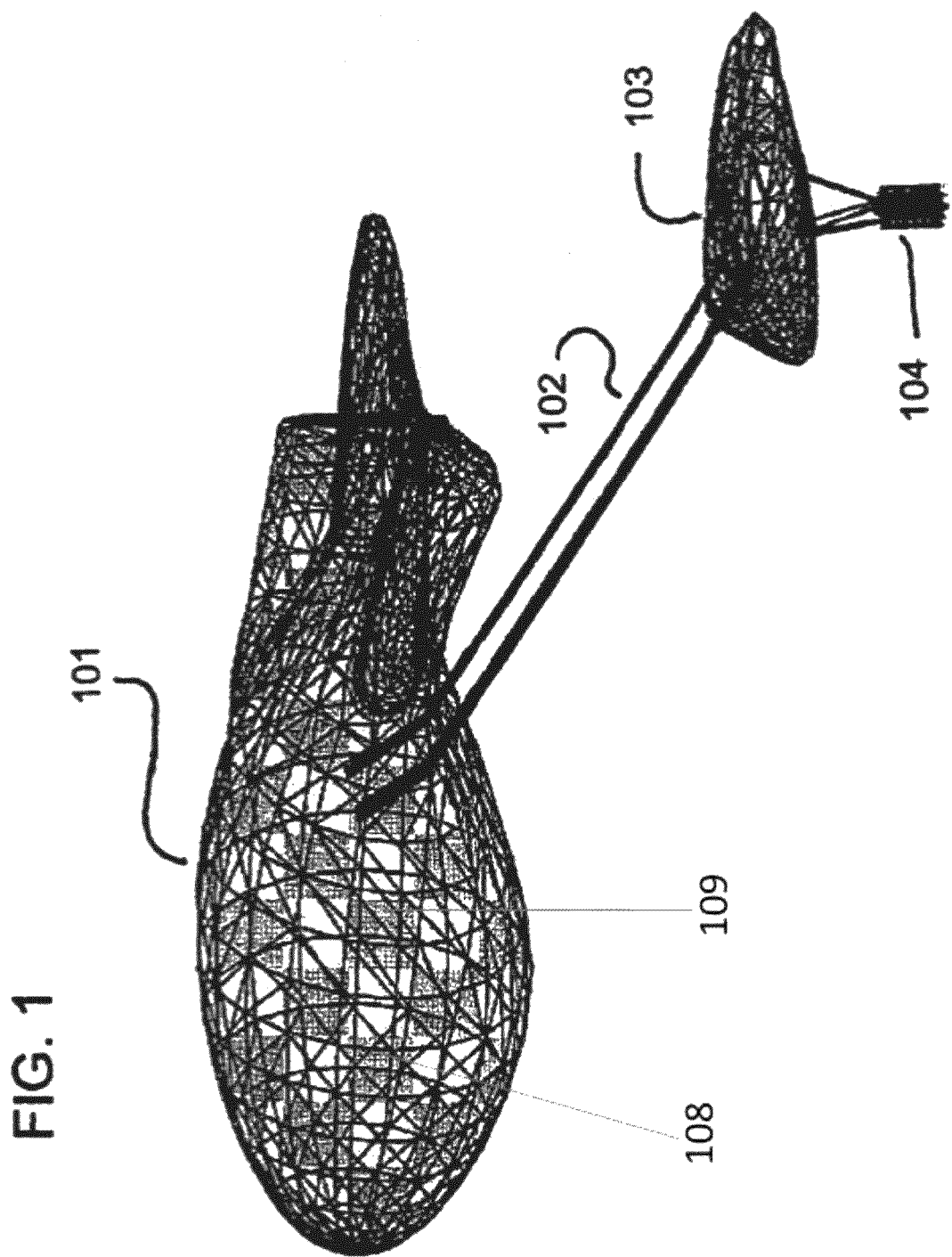
FIG. 1 is a side view of the present invention showing positioning of the Airship and Skycrane in decoupled mode during payload transfer operations.
Figure 2:
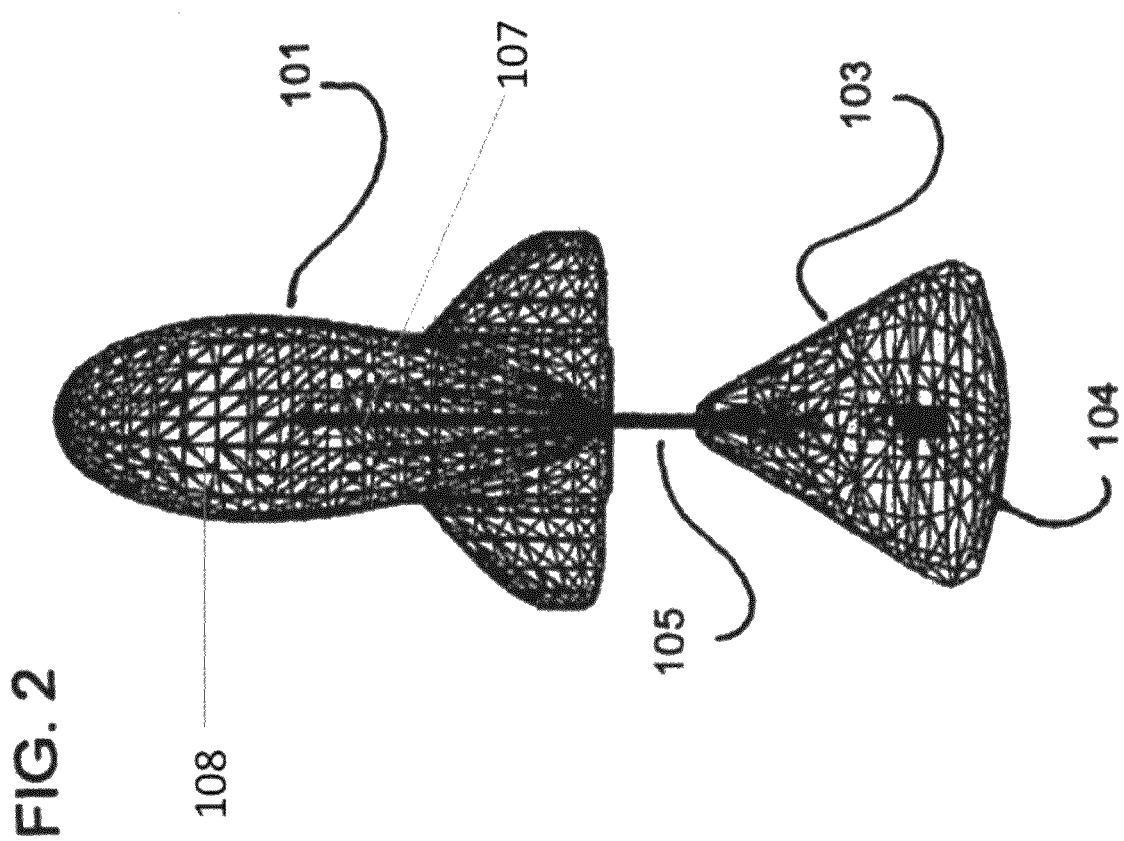
FIG. 2 is a bottom view of the present invention showing positioning of the Airship and Skycrane in decoupled mode during payload transfer operations.
Figure 3:
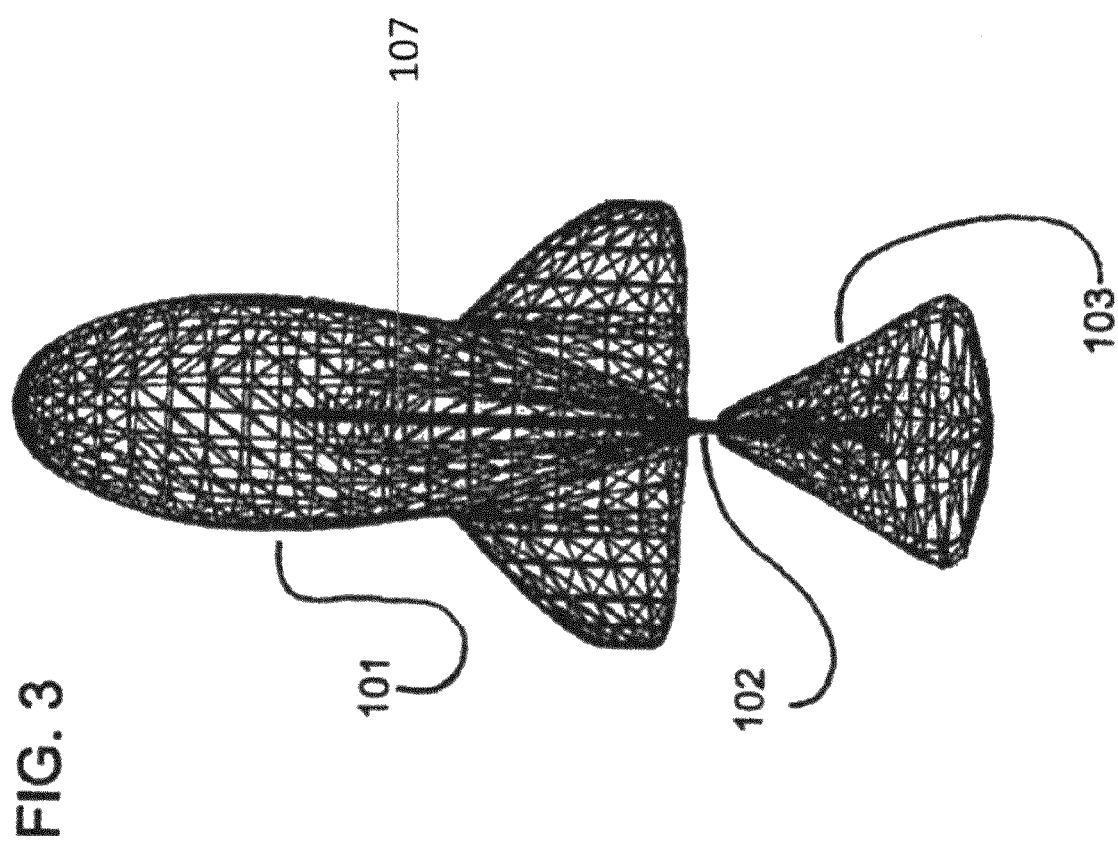
FIG. 3 is a top view of the present invention showing positioning of the Airship and Skycrane in decoupled mode during payload transfer operations.

Overall, the present invention represents a new structural design approach, and utilises an innovative lift and control strategy (e.g. optimum heaviness ratio strategy, trim management, VTOL performance, along with vectored thrust, etc) for precise point to point very heavy lifting. As a fully integrated semi-autonomous, inflatable multibody system, this VTOL air-crane contains three distinct subcomponents: an Airship 101, Skycrane 103 and Loadframe 104 with payload. During heavy lift operations, these three subcomponents are decoupled but physically linked via high-strength aramid tether lines.

The embodiment represents a scalable prototype. Scaling up the individual subcomponents in this multibody system would require structural adjustments including the regauging and realignment of the cabling system, to maintain stability and trim during payload transfer operations. Scaling up the system would increase the system's overall heavy lifting capacity, to as much as 500+ tons.

Especially intended for performance of heavy lift cargo transfer operations between ships or transports at sea, this lighter-than-air configuration is not a giant airship in the traditional sense. Instead, this VTOL aircrane employs multibody system dynamics with three distinct subcomponents: Airship, Skycrane and Loadframe. By dividing the essential functions: power and propulsion, maneuver, and payload lifting into smaller, more discrete, mutually supporting, manageable, and controllable sub-units, along with introducing tethers and rigging and elongating the air-crane's shape, this VTOL aircrane's physical size is more easily managed in headwinds and crosswinds, each subcomponent's aerodynamic features (as a function of each components Reynolds numbers and boundary layers) are made more flexible and maneuverable, air resistance is reduced as a countervailing force, the risk of collision with a ship's superstructure or deck is lessened, and each flight control for each component, when combined with propulsion and active ballast control, is made more precise to complete the task of point to point transfer of very heavy payload.

When these subcomponents are decoupled (during heavy lift operations), the Airship and Skycrane carrying a Loadframe orients into the prevailing wind and gains aerodynamic lift, i.e. face nose up into a headwind. For optimum performance in very heavy vertical replenishment, and greatest stability, the containership or smaller supply ship below sails in a sea lane with winds to the stem in following seas of 6 knots or lower. At the same time, the Airship/Skycrane flies into headwinds, hovers and performs station keeping relative to the target area below. In both cases, wind direction (onshore or offshore breezes in coastal zones) provides a vectored force that drives both wave and wind action to stabilize and align the entire multibody system.

The Skycrane incorporates NIST's RoboCrane technology featuring adjustable and suspended computerized rigging and platform, attached to the Skycrane and suspending the Loadframe, for exact maneuvering with six degrees of freedom (DoF), to manage close-in positioning and refine oscillation control and stationkeeping of the Loadframe/"Soft-Landing mechanism." Utilising an adjustable ballasting system, lift-on or lift-off (Lo/Lo) cargo transfer operations under random Sea States 3, 4+ in higher velocity winds over a body of water can safely and efficiently be performed.

The Skycrane's own lifting and flight performance is achieved through its delta wing design that takes advantage of the variation in wind velocity with altitude. This delta wing generates a horizontal lift force that can be directed over a wide range of angles for maneuverability. This high-lift wing geometry is characterized by large amounts of leading-edge camber and bluntness, resulting in a high drag penalty, but creating ideal conditions for low speed maneuvering.

The IT Flight Control System exploits the natural wind field variation with altitude to generate passive lateral control forces effecting the interactive tether dynamics between the Airship and Skycrane, also bolstered by the tethered-deployed aerodynamic surfaces. Of particular significance is the Skycrane's relative position to the Airship, the Airship's thrust, and the length and angle of attack of the tether control line. These factors can adjust Skycrane's altitude and stationkeeping position, especially in high velocity winds when over a body of water in higher sea states.

Taking advantage of a wind speed or wind direction with height (weathervaning), the Skycrane can change its own vector motion by changing altitude which (achieved through the HE circulatory system). The Skycrane uses an Elevon for flight control. The Skycrane's envelope and airbeam framework can accommodate HE running through its circulation system that inflates or deflates (expends and contracts) to meet the weight/ballast requirements of the payload. The Skycrane with its suspended Loadframe maneuvers and positions above the containership ship below for payload transfer. If the Airship/Skycrane is already deployed and extended overhead within a sea lane, the containership or supply ship would position itself below in a following or head sea.) Thrusters are employed for stationkeeping, attitude and flight control.

This configuration with atypical geometries incorporates subsystems for active ballast control and precise point to point transfer of very heavy cargoes. These subsystems include a power plant with jet turbine and Fellows Research Group Thermoacoustic (TAC) engines for propulsion and electrical power generation, superheated HE cells, a helium forced circulation system, mechanical payload systems, along with various mechanical and pneumatic systems a mobile robotics software for semi-autonomous flight control and trajectory capabilities for optimum maneuverability and navigation.

Active Ballast Control & Architecture

Innovative technological approaches are necessary to achieve desired operational performance and capability. A primary reason for the Airship/Skycrane's multibody design shapes and subsystem configurations are to solve the critical problem of weight ratio as related to Active Ballast Control.

Two key objectives for this design are that the unmanned Airship/Skycrane have exceptionally lifting capacity (200+ tons) due to active ballast control management and the incorporation of high strength materials and unusual architecture (airbeams, S-keel, multibody system platforms, etc.) and that it operate with a sufficiently high-level of autonomy.

The buoyancy force of helium provides an energy-free form of lift. In order to achieve these objectives, a robust guidance and control system is required, capable of autopiloting and controlling the multibody configuration under an extremely wide range of atmospheric and wind conditions. The successful design of such a system requires an accurate model of airship dynamics across its expansive flight envelopes, and a representative model of the expected disturbances. The dynamics of this VTOL Air-crane are markedly different from traditional aircraft, with significant effects from added mass and inertia, and a much higher sensitivity to wind. The configuration is first sized to meet energy balance and mass constraints.

The geometry of this configuration is then used for sizing and developing a general aerodynamic model and control law for the Airship/Skycrane. Open-loop dynamics would be analyzed across a range of flight conditions. Finally control laws are designed for a single operation condition and closed-loop performance across a range of velocities.

The present invention constitutes a tethered lighter-than-air system with variable geometry designed especially for very heavy cargo transfer operations between ships underway at sea. In terms of overall proportions, a larger Airship and smaller Skycrane, in a 3:1 ratio, achieves optimal efficiency by a progressive reduction of the physical size and dimensions of the interacting subcomponents, from Airship to Skycrane to Loadframe/payload. This configuration or "ratcheting down" of the subcomponents reduces air resistance/drag and enhances maneuverability and control of each subcomponent within the multibody system for precise point to point transfer of heavy cargoes at sea.

The Airship and Skycrane design, with soft aerodynamic contours, creates efficient boundary layer air flow, for maximum buoyant lift, kinetic lift, maneuverability, propulsive control and operational safety. Flow values for such subsonic structures with high Reynolds numbers are maximized for fuel conservation, stability and trim.

When decoupled, during payload transfer in underway replenishment, the Airship and Skycrane/Loadframe are interconnected and have interplay by way of a high tension, ultra-strong cable or tether control line. A Laser Direction Finder (LADAR) would beam along the tethered control line to orient direction, determine angle of attack, measure distances and control line tension and tensile strength requirements during cargo transfer operations.

Figure 4:
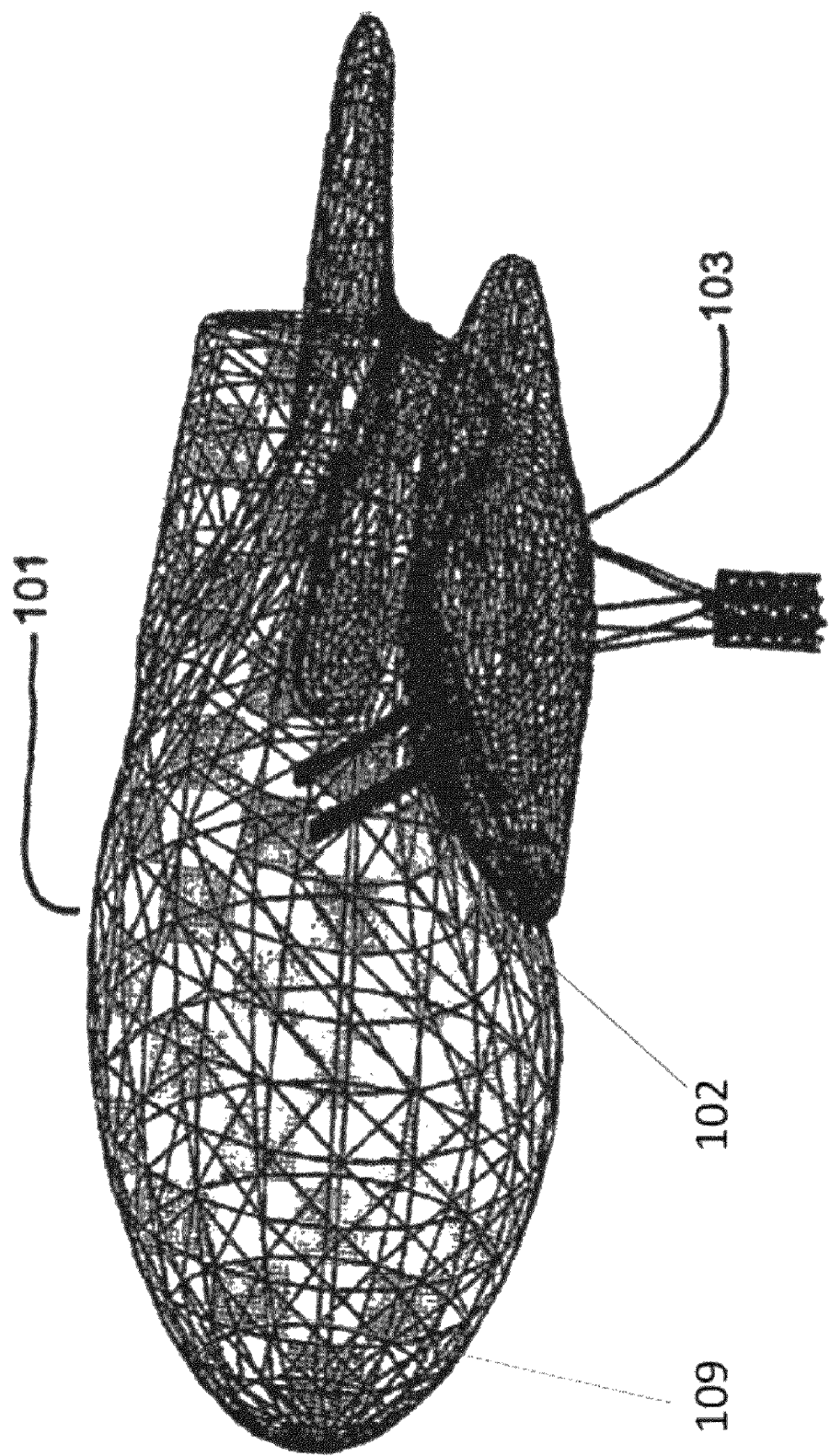
FIG. 4 is a side view of the present invention showing positioning of the Airship and Skycrane in coupled mode during forward flight.
Figure 5:
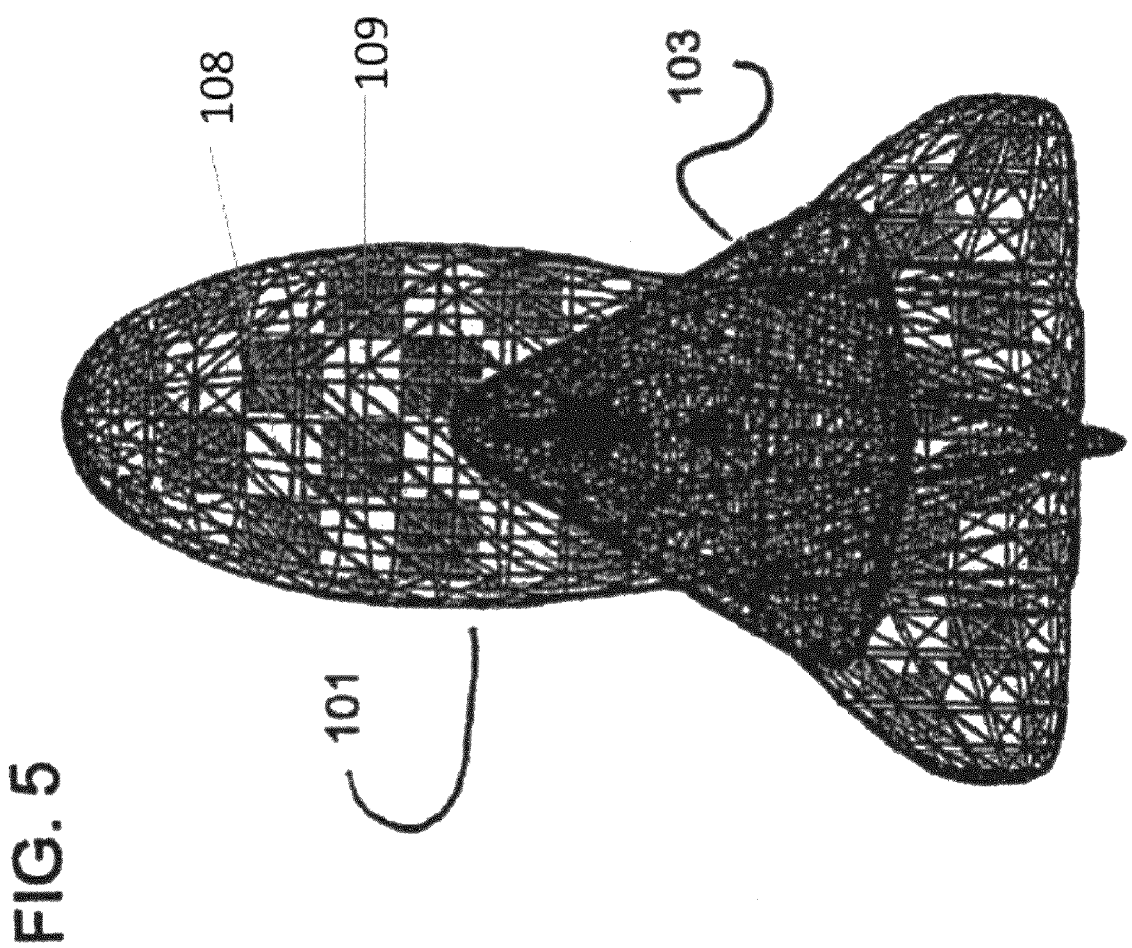
FIG. 5 is a bottom view of the present invention showing positioning of the Airship and Skycrane in coupled mode during forward flight.
Figure 6:
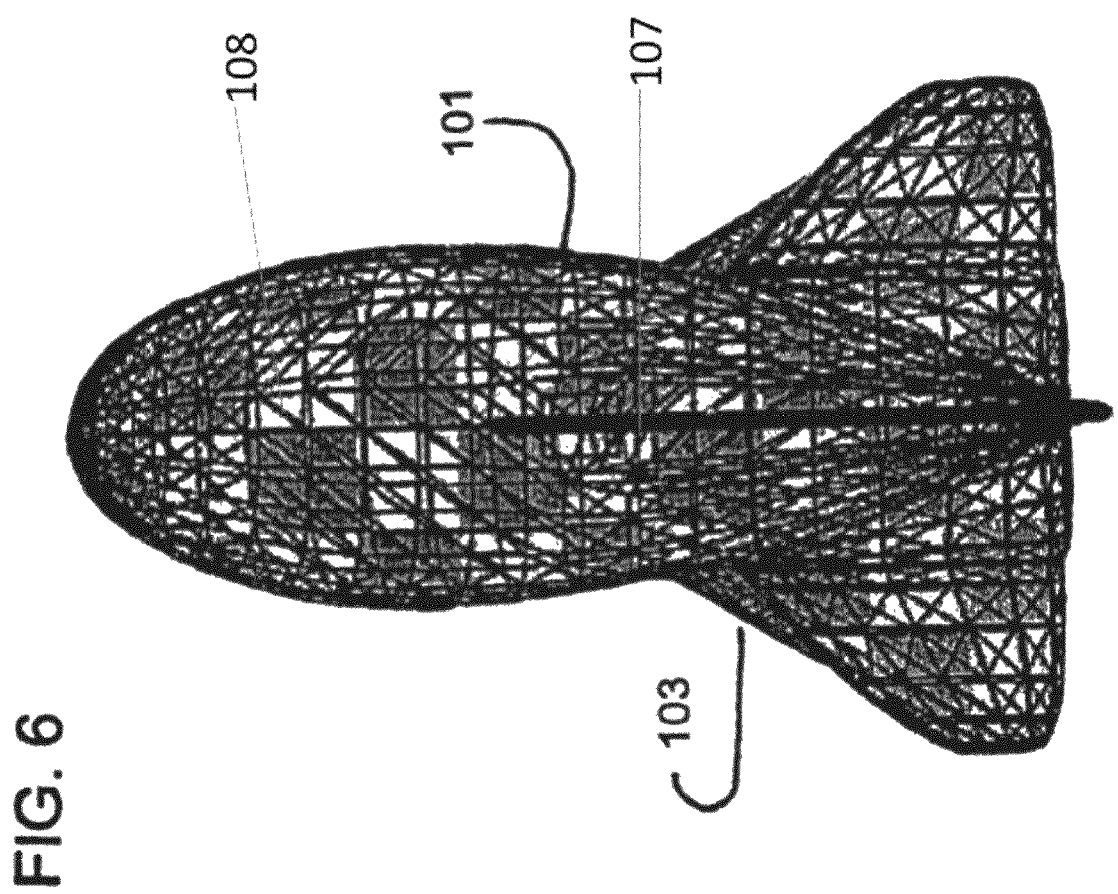
FIG. 6 is a top view of the present invention showing positioning of the Airship and Skycrane in coupled mode during forward flight.
Figure 7:
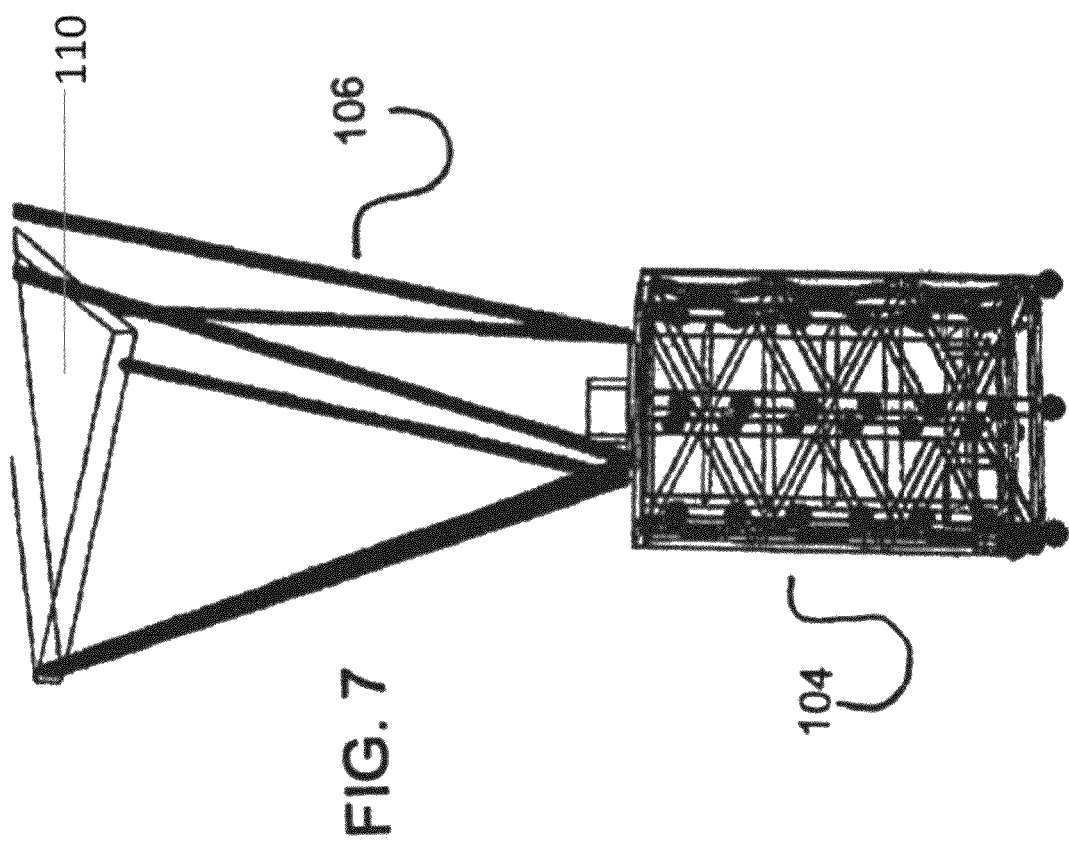
FIG. 7 is a side view of the present invention showing positioning of the Robocrane carrying a suspended Loadframe during payload transfer operations.
Figure 8:
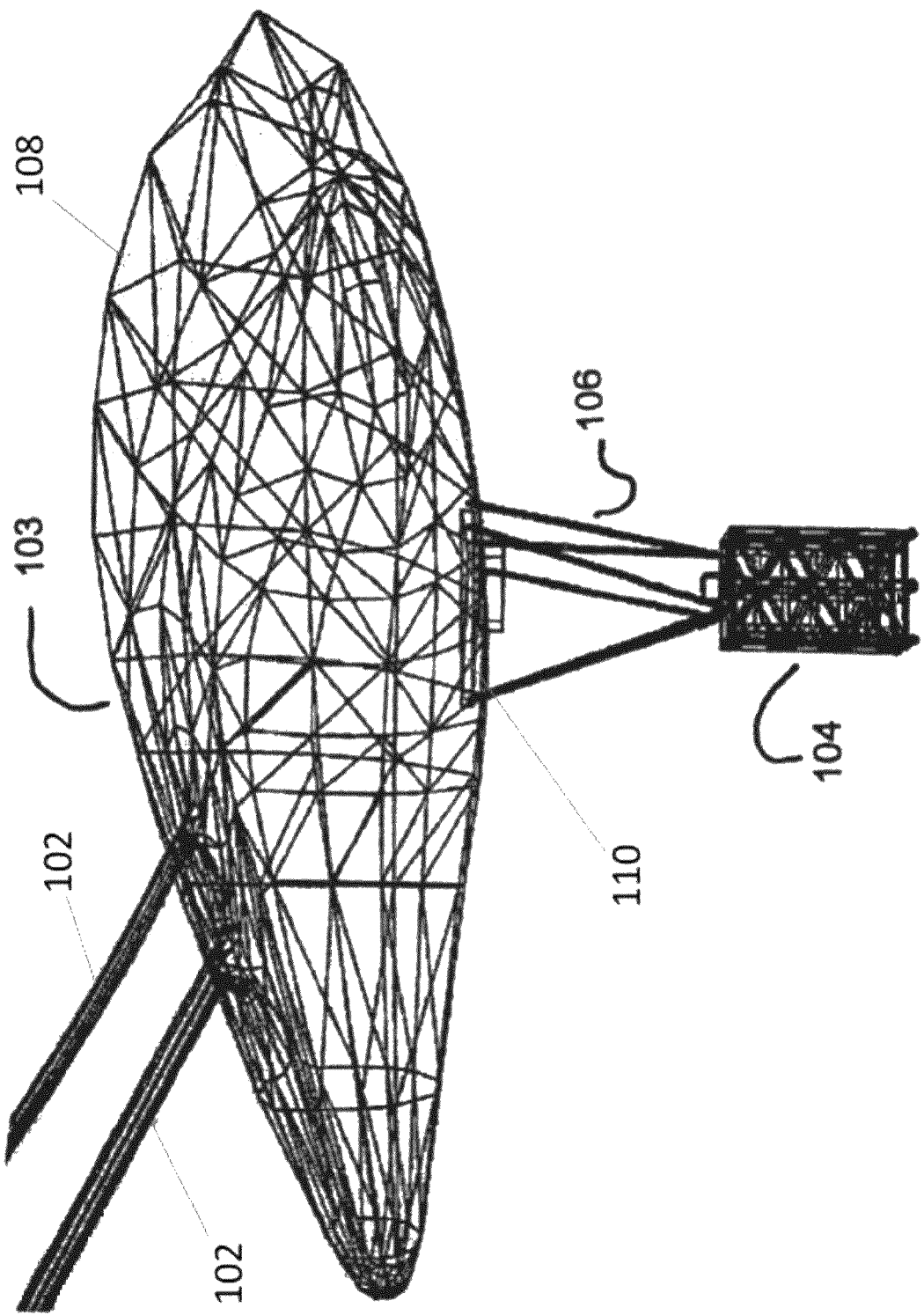
FIG. 8 is a side view of the present invention showing positioning of the Skycrane tethered to the Robocrane carrying a suspended Loadframe during payload transfer operations.
Figure 9:
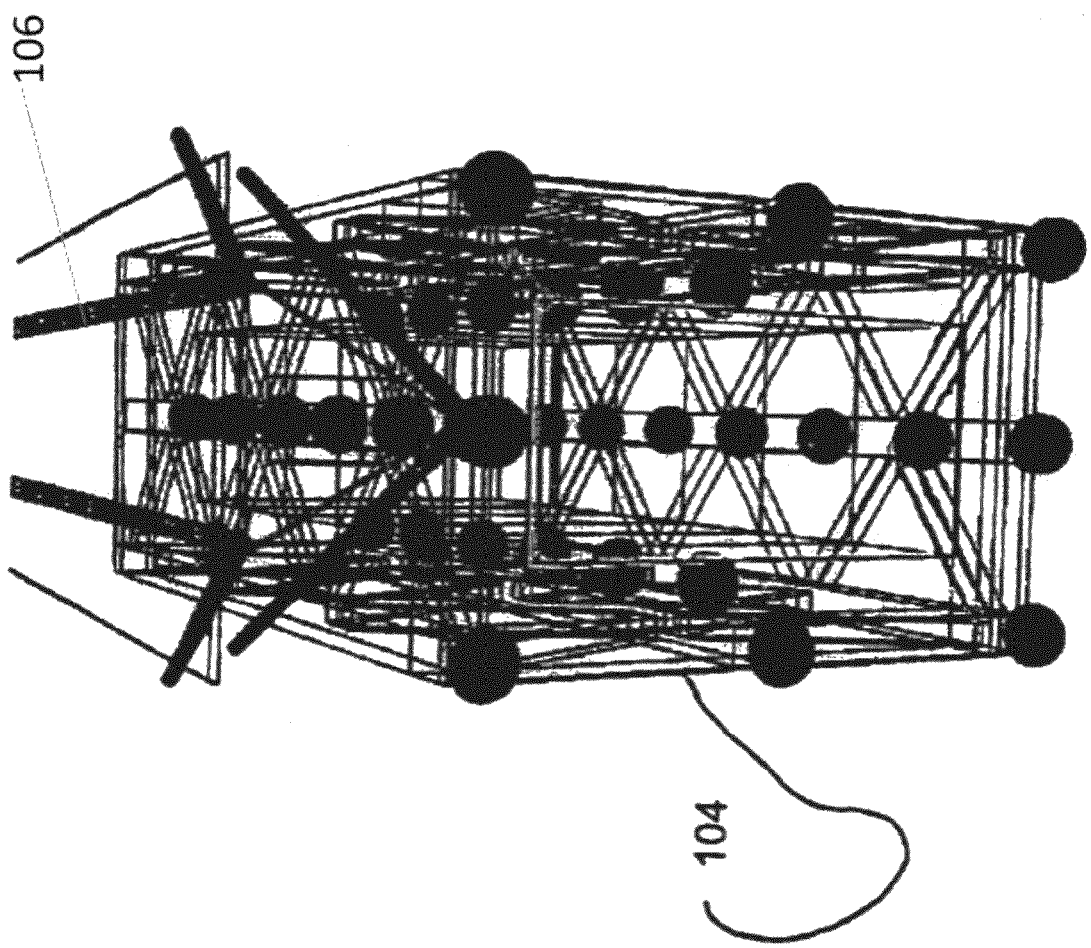
FIG. 9 is a bottom view of the suspended Loadframe of the present invention.
Figure 10:
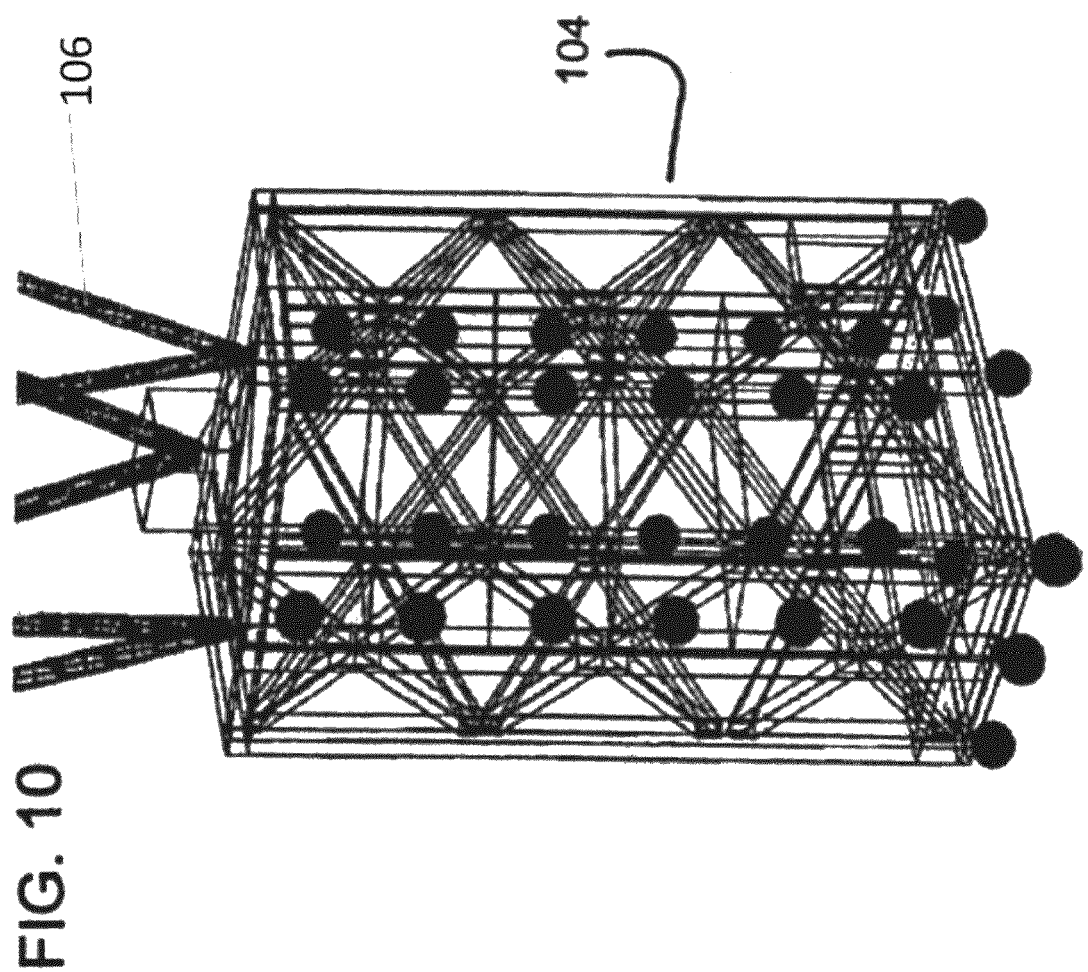
FIG. 10 is a perspective view of the suspended Loadframe of the present invention.

When coupled together during forward flight, as shown in FIGS. 4-6, the tethered Airship and Skycrane could form a single aerodynamic body that combines buoyant lift with kinetic lift. A variable geometry aircraft such as this uses buoyant lift as a function of the volume of gas and the flight attitude; the kinetic lift is a function of the interlocking architecture that forms an aerodynamic airframe that generates lift in the presence of forward thrust.

This heavy lift aircrane features a mobile robotics computer software architecture to perform flight path planning and tracking, active ballast control, and adjustment of platform motions using sensors and actuators in order to coordinate with containerships/platforms involved in the at-sea material transfer. Sensors measure the wind and wave environment in a seaway to enable predictive control and reactive actuator motion control to achieve dynamic positioning of this lighter-than air system with load frame and payload to achieve between all bodies within the multibody system tension sensing, situational awareness, distance sensing, load position/dynamics sensing, relative motion sensing and mitigation or compensation and positive load control. For active ballast control to perform timely and precise point to point transfer of very heavy cargoes at sea, this design also features a semi-autonomous flight control and navigation system operating within a WiMAX wireless broadband network, and sensor/actuators to operate and integrate a helium forced circulation system, superheated helium cells and mechanical and pneumatic payload subsystems.

The Airship/Skycrane/Loadframe during payload transfer operations would operate at low maximum ceilings over a body of water. Flying at low speeds and low ceiling heights, approximately at mean sea level (MSL), well below pressure height, above cargo ships, conserves helium for reduced operating costs. Wind speeds generally increase as height or altitude increases. A typical wind blowing over water increases, say from 3 knots on the surface, to 4 knots at 7 feet up, and to 5 knots at 1.5 feet. This increase continues logarithmically up to the top of the "friction" layer at 2000-3000 feet.

The embodied aircrane design represents a scalable prototype. Scaling up the individual components in this multibody system would require structural adjustments including the regauging and realignment of the cabling system, to maintain stability and trim during payload transfer operations. Scaling up the system would not only increase the system's overall lifting capacity, to as much as 500 tons or more.

Crucial aspects contributing to the multibody system dynamics are the real-time reactive computations and predictive motions of the Airship and its tethered Skycrane with a suspended Loadframe.

For at-sea cargo transfer operations, the core issue is the synchronizing or "tuning" of relative motions of the Airship/Skycrane and Loadframe, the cargo and the containership. To accomplish this mission, the embodied design achieves relative motion situational awareness and control between all components of the multibody system.

Current limitations restrict heavy lift airship use and cargo transfer operations over ships at sea.

Air resistance is one of the most important considerations in determining the tethered Airship/Skycrane's size, stability and propulsive capacity. Although the aerodynamic design of a modern airship has a low resistance coefficient, the area relevant for air resistance is huge. Frictional resistance, created by currents around an airship is also a major factor. Calculations for "True wind" and "Apparent wind" must be made. True wind is the actual wind blowing over the ocean's surface. Apparent wind is the air flow that strikes an airship in motion. In the boundary layer, the air around the body must also be accelerated. Because air resistance increases by a power of two in relation to speed, it is also a major factor in determining the overall maximum speed an airship can reach.

The Airship tethered to the Skycrane with suspended Loadframe or "Soft Landing Mechanism," together with the container ship below is represented as one multibody system. A critical issue involves the hydrostatics (stability) of the Airship, Skycrane and Loadframe along with the cargo vessel's stability and trim during payload transfers. Sensors would provide real-time data measurements to allow the virtual IT/Communications/Flight Control System simulator to generate calculations to account for the relative motions of each component, and then use algorithms to determine and send commands to actuators to direct flight path trajectories.

At sea, atmospheric pressure is greater at lower altitudes. Flying at low ceiling heights, approximately at mean sea level (MSL), this Airship/Skycrane/Loadframe utilises a helium circulation system and a superheated helium for maximum effect to conserve HE and efficiently transfer heavy cargoes at sea. The difference in buoyancy force for helium under ambient temperatures in low and high altitudes can vary as much as 10-15%. When pressurized and superheated HE is used at MSL this lifting capacity increases.

This invention incorporates structural materials and design components with appropriate stiffness to withstand stresses on internal and external structures including the Airship, tethered control line, Skycrane, and suspended Loadframe, caused by real-world forces such as clear-air turbulence, crosswinds, prevailing winds, undulating wave heights, tidal shifts, abrupt weather changes, maneuvering and heavy weight transfers.

The Airship/Skycrane/Loadframe addresses critical factors in payload transfer operations of ISO 20' containers at sea to account for relative motion, predictive control and reactive-actuator compensation, This six-degree-of-freedom air-based crane controls the container load, withstands the forces imposed, and compensates for the relative motions in conditions of high sea states.

Multibody Aircrane Architecture

Most current airships employ the pressure envelope design principle. However, the embodied Airship and Skycrane system, structure, envelope design, and drag coefficients, do not rely on this principle. Instead, structural rigidity is achieved by lightweight spars known as "Airbeams". When this "skeletal" arrangement is combined with an outer envelope, flow values for such subsonic structures with high Reynolds numbers are maximized for stability and trim. The shapes of these bodies are curvilinear to achieve "soft" contours for aerodynamic performance, efficient boundary-layer air flow, and to minimum turbulence.

With such large movable structures, a new problem has become increasingly important: stability. If two or more components of this multibody system begin moving to the beats of different drummers, the entire structure could easily be severely damaged. One solution to the problem is to design in added rigidity, but that adds weight, which can significantly increase cost.

The internal structure and envelope design has high tensile strength and durability, but also be lightweight, in order to withstand the extreme stresses associated with heavy lift cargo transfer operations, atmospherics (temperature, humidity and air pressure changes), internal overpressure and forward flight. Computer analysis identifies and calculates major structural stress points effecting the Airship and Skycrane (external forces on free bodies) as well as internal shear and bending moments, in order to mitigate against them. Another key objective of this lighter-than-air aircrane system is to reduce the power and fuel supply requirements for forward flight and very heavy cargo transfer between ships underway at sea.

Airship

The Airship may be described as a Semi Rigid design: The primary purpose of Airship is to serve as an "anchor" to provide thrust, pull or release, buoyancy and stability while extending its reelable Tether Control Line 102 to allow the Skycrane and its suspended Loadframe (via a NIST Robocrane) to maneuver and precisely position at low speeds and establish stationkeeping relative to the supply ship during heavy cargo lifting or transfer operations.

Ultimately, by orienting to and positioning into the prevailing wind, with this headwind increasing its kinetic lift, the larger Airship with jet propulsive capacity and power supply serves to align and hold the tethered Skycrane and its suspended Loadframe in place throughout heavy cargo transfer operations. Because the Airship must support very heavy loads, whether during decoupling and coupling with the Skycrane or during cruising or landing, it needs to incorporate a reinforcing structure: a keel.

This floating body therefore is a semi-rigid airship. A cardinal principle of the semi-rigid design is to fix the keel under the envelope. Advantages of such a design include better distribution of efforts within the envelope and easier management of the internal pressure inside the envelope.

S-Keel

The design of Airship incorporates an S-Keel 107. By incorporating an S-Keel into the shape of Airship and contour the floating body becomes an axisymmetric 2.72:1 body. This configuration, incorporating an aft concave shape, takes advantage of "pressure thrust" during payload transfer operations.

Airbeams

Airbeams 108 are ultra-strong, fabric tubes filled with high-pressure air. Vertigo Corporation, Lake Elsinore, Calif. and Natick Army Labs Center for Inflatables, Natick, Mass., have conducted many experiments that show that airbeams constructed of braided fiber provide a safe method to contain the high pressure air. Constructed of a high strength, seamless Vectran® fiber braided sleeve, the airbeam's structural capability is a function of pressure and diameter. Vectran®, with a strength 5.times stronger than steel, is the fiber of choice for this high-pressure inflatable. To fabricate a high-pressure airbeam to support a 100 to 200 ton load, an 8-foot+ diameter sleeve is required. For even greater loads, an airbeam with even higher tensile strength means sleeves of an even greater diameter, perhaps from 16 to 32 feet. An airbeam, relative to its own weight, presents great stiffness against forces such as bending, traction, compression, and twisting. The air permeability of Vectran® can be adjusted with a thin coating of silicone rubber. For the Airship's S-Keel, airbeam technology provides the necessary strength and rigidity. The S-Keel is made of a bundle of airbeams. The Airship's S-keel is stiffened by appropriately pressurization of airbeams to withstand the dynamic stresses created by the tempered HE system and HE circulation systems as well as load interaction with the tether control line and Skycrane.

The use of airbeams throughout the entire aircrane allows all platforms to be "rigidized", that results in a structure with increased stiffness, as compared to a structure supported by inflation pressure alone. Regulating air inflation by localized pressurization of its airbeams allows the aircrane to specifically adjust its tensile strength to specific points within a given locus, i.e. a collection of points which share a property. The term 'locus' is usually used of a condition which defines a continuous figure or figures. For example, an ellipse is the locus of points, the sum of the distances from which to the foci is a given value. This adjustment allows regions of the platform to accommodate loads with varying stress demand and limits.

Recent experiments on tubular structures under high pressure at the Laboratore de Genie Civil de Nantes, Faculte des Sciences et de Techniques, Universite de Nantes in France, conducted by scientists C. Weilgosz and J. C. Thomas and P. Casari, have yielded interesting results. These experiments on high pressure of Inflatables Tubes (beams) have demonstrated some of the following characteristics:

The behavior of these beams acts as a linear combination of yarns and beams. A stiffness matrix is dependent upon the internal pressure of the inflatable beam.

Inflation causes pre-stress in the walls and in the yarns of the structures. This pre-stress is proportional to the pressure and insures an important mechanical strength.

The analogy between the collapse plastic analysis of beams and the theoretical results obtained on collapse loads of inflatable beams compared to experimental results proves that one can use the "plastic" theory to compute collapse loads for the inflatable beams at high pressure. Development of the plastic area is analogous to the expansion of a pnuematic hinge, and when the external load equals the collapse load, the pneumatic hinge has no strength. The beam becomes a mechanism and the collapse load is reached. The main difference between the plasticity and the mechanical behavior of the inflatable beam is that plasticity gives residual strains and that shakedown is reversible for inflatable structures; They come back to their original position after unloading.

Shear stresses play an important role in the behavior of the beam.

Drawing upon Shakedown Analysis of beams, "Wrinkle load" phenomenon is defined when the local resultant stress in the fabric begins to cancel in a side of the beam. The Wrinkle Load is always obtained when the resultant stress cancels on the upper or lower generative of the tube. They have defined the collapse load when the resultant stress cancels a generative parallel to the neutral fiber of the tube. One of these generatives that gives rise to "Bending Momentum."

Collapse Loads are obtained from equilibrium equations. Equilibrium equations are written in the deformed state of the beam to take into account the geometrical stiffness and other forces (such as the angle between the membranes and the horizontal axis). Collapse loads can be obtained by the theory of limit analysis. The value of deflections depend on the rigidity of the beam. Inflatable beams cannot be viewed as ordinary beams, because their deformation pattern is a set of tensioned yarn and beam behavior. Timoshenko's beam theory must be used because sections of the beams do not conform to the equations of normal Bernoulli beam theory.

Collapse Load is defined when the structure becomes a mechanism. An important property of inflatable structures is that collapse is reversible: after unloading, inflatable structures come back to their initial position. Wrinkling and/or load limits are proportional to the applied pressure, therefore, high pressure offers better mechanical strength in inflatable structures.

Using airbeams as air-inflated, high strength fabric spars that comprise an internal "skeleton" allows a skin to be placed over the surface of the structure to provide a smooth aerodynamic surface. With Lighter-than-Air platforms it is desirable to reduce the internal pressure of helium-inflated gasbags to as low as possible to reduce the mass of the inflation system and structure, and reduce leakage rates. Moreover, adjustment of air pressure in airbeams allow for appropriate active stiffness for dampening of oscillations by responding and adapting to external, dynamic real-world forces. Ultimately, the incorporation of airbeam construction with high strength fabrics allows the present invention to adjust and respond to very heavy loads, whether borne by multibody system and tether dynamics, weather and atmospheric conditions, and most of all, cargo transfer.

Airship Envelope

Having a geometry to perform as a aircraft fuselage in forward flight or as tethered stabiliser during the Skycrane's stationkeeping and payload transfer operations, the Airship must have an envelope 109 with sufficient strength and rigidity to withstand this platform's external pressure, its internal airbeam "skeleton" and power and thrust requirements.

Spectra®

An advanced fabric currently used in NOAA Smart balloons, is Spectra®. A product of the Allied Signal Corporation, Spectra® 900 is a fabric ten times stronger than steel, with a modulus stronger than any fiber, except carbon. It has excellent flex, UV and abrasion properties. When it undergoes gas plasma surface treatment, Spectra® is reinforced and the top molecules are "reengineered" to provide waterproofing.

The exotic delta shape of the Airship requires a stronger material such as this. This material can have a tensile strength of about 2000 pounds. Its scrim weight would be about 15 ounces of yearn per square yard. With this material it is possible to carry about 200 tons of payload and that is about what CargoLifter needed for its proposed CL160. If one continues tip the curve, this kind of material would be required for future Lighter-than-Air platforms with a carrying capacity of between 500 and 1000 tons respectively.

High strength material is certainly within TCOM's capability. The material TCOM manufactured for CargoLifter's CL75 had a gross lifting capability up to 100 tons. The payload module on it weighed about 25 tons, giving it had a net lifting capacity of 75 tones, hence the name CL75. The envelope contained 4.3 million cubic feet or about a 110,000 cubic meters % with a diameter of 61 meters. The tensile strength of this material was about 700 pounds per linear inch. Each inch strip of this material could bare 700 pounds and not break. The weight of this material was 11 ounces of yarn per square yard.

A high molecular weight polyethylene, Spectra® is a product of the Allied-Signal Corporation. Spectra® has the highest modulus of any fiber, except carbon, used in sailcloth, but has seen limited application in racing sails because of its creep property, meaning that the fiber will permanently stretch when placed under high constant load. This stretch makes it difficult for sail designer to lock in the shapes they want. As a result, Spectra® is viewed more as a performance cruising fiber where its excellent flex, UV and abrasion properties along with its traditional white color are perfect for large cruising boats where cloth strength and durability as well as weight aloft are considerations.

One consideration, however, concerns the Airship's superheated helium system, with its potential shrinkage to the envelope made of Spectra®. Spectra® decomposes at 296 degrees F. To mitigate this effect from very high temperatures, a load patch made of carbon fiber is seamed in and bonded to the Spectra® envelope to insulate the central, topside section of the Airship in the shape of an ovoid, polycentric curve, i.e. a curve with more than one center, but very approximate to an ellipsis.

Seaming

Seaming technology has evolved over time. Two pieces of material are brought together, a structural bridge is placed on the bottom and then put a UV barrier on the top. These pieces are welded together. The trick is to get the seams so that they are actually stronger than the base material. Manufacturers such as IL Dover and TCOM create load patches with sewing and then weld that into the material. Specific load patches of over 12,000 pounds can be produced. TCOM can manufacture such larger envelopes, although the seaming gets to be more challenging because the materials can have tensile strengths up to a couple of thousand pounds.

Airship Special Aerodynamics

Pressure Thrust

In terms of basic physics, the principle remains quite simple: to accelerate any object or body, push it. In terms of potential flow aerodynamics, it not much more involved. But to push a large body, such as a cargo aircraft, requires large fuel consumption.

Leading aeroengineers have found a revolutionary airframe design that solves the problem of maintaining forward thrust while reducing fuel consumption. NASA Langley chief scientist Dr. Dennis Bushnell used the term "Pressure Thrust" to describe the airframe's effect. Westinghouse Electric research scientist Fabio R. Goldschmied confirmed the nature of pressure thrust in wind tunnel tests.

Pressure drag can be described by comparing the pressure acting on the rear of a body, with the pressure acting on the forward section of the same body. In the emerging "open thermodynamic" design philosophy, energy can be used to increase this ratio directly.

The embodied Airship design with an S-Keel increase both the pressure coefficient (Cp) of the aft section and the surface area on which that increased pressure will push. The increase in available surface area generates increased pressure thrust. Indeed, the whole aft body portion can become a sink, with an increased pressure coefficient (traditional closed thermo aft stagnation point pressure coefficients are usually at or below 0.2). If the amount of cross-section area devoted to the concave shape required for pressure thrust can be increased from the 16-25% used by Goldschmied, the push from pressure thrust increases exponentially as that area increases.

Airship Utilizes Jet Power and Propulsion

Jet-propulsion of a subsonic body is a classic problem in aerodynamics. Aero scientist Fabio R. Goldschmied has solved this problem. After working as a consultant on an research project in 1983 for DARPA and Surface Effects Department, David W. Taylor Navy Ship R&D Center, he published his findings in "Jet-Propulsion of Subsonic Bodies with Jet Total-Head Equal to Free Stream's." In this monumental research paper, on page one, Mr. Goldschmied wrote:

"Jet propulsion of a subsonic axisymmetric 2.72:1 body has been achieved in a low speed 8'.times.10' wind tunnel at a volume Reynolds number of 2 million with a stern jet total-head equal to free stream's and therefore with a 100% propulsive efficiency. The jet exit velocity was 33% lower than free stream's and the jet exit static-pressure was over half the stagnation value.

"The aerodynamic basis for this milestone was provided by the Integrated pressure-distributed boundary-control/stern jet propulsion design concept. Large excess thrusts have been also generated with higher jet flows, with an incremental propulsive efficiency Lip to 85.1. %. The propulsive power reduction of up to 50% has been achieved with the integrated self propelled wind tunnel-model, as compared to the best conventional streamlined bodies with wake stern propellers, at the same volume Reynolds number."

The embodied Airship design incorporates a subsonic axisymmetric 2.72:1 body, provided by an S-Keel, and applies the principle of "pressure thrust" and jet propulsion. During cargo transfer operations when the Airship is decoupled from the Skycrane, subsonic, low speed jet propulsion provides necessary power for tether control line tension to prevent oscillations and Skycrane control for its maneuvering, positioning and station-keeping.

Tether Control Line

Another aspect of this invention is to introduce a tethered control line between the Airship and Skycrane to achieve improved flight control, stability, term and lift performance of each floating body during cargo transfer operations at sea.

The angle of attack and tensile strength of the tether control line extending from the Airship to the Skycrane is evaluated by a computer in order to determine pressurized HE inflation/deflation adjustments and propulsion requirements of each component in this multibody aircrane system.

Preventing Structural Failure

The Tether Control Line requires a tether structures capable of providing both very high strength-per-weight and very high survivability for long durations in the sea based environment. Hoytether design, for example, is a sparse, open net-like structure that provides multiple redundant load- and current-bearing paths to ensure high survival probability for the long durations developed for space applications. The Hoytether structure can be expanded to very large diameters with low mass penalty, enabling it to provide the capability to survive impacts.

In reference to possible tether material, in terms of strength per density, a strong, light weight material is needed. The best high strength candidate is Spectra®, multi-strand, light weight, durable yarn that survives multiple breaks, with a safety factor of 3.5 Spectra® is a highly processed ultra high molecular weight polyethylene (UHMWPE) made by Honeywell. Spectra® offers good UV resistance (on par with polyester), very high initial modulus numbers, second only to high modulus carbon fiber, superior breaking strength, and high flex strength. But it also exhibits a property known as "creep", permanent, continuous elongation under a sustained load, that results in a change in shape. In all, the characteristics of Spectra® make it an ideal material for this tether control line. Use of the recently-developed computerized braiding system achieves maximum strength-per-weight performance for this multiline tether structure.

Tether Reel and Winch Mechanism

The mass of tether reel and winch mechanism 110 is roughly equal to that of the tether it deploys. It is positioned at midship along the S-keel above a bridle point for the tether control line.

The bridle point fixed to the keel approximately at midship features a modified ring and pintle system that allows the Airship to rotate no greater than 18-degree axis in response to cross winds. The tether control line along with a reelable, and much larger two-way helium transfer hose and reelable insulated electrical cable extend to the Skycrane below. This entire bundle of loose and reelable lines is constrained by periodic sets of brackets.

Tensile Strength and Torque
Required Lift

If the Airship flies below the horizon, elevation of the Skycrane, the tangent of the angle $\Theta$ in the formula for the lift becomes negative. Thus flying low reduces lift. This is because the centrifugal force tries to pull the Airship back to level flight. Again, the magnitude of this effect depends on the speed and the length of the cable lines. For typical control line models, the required lift generally increases with positive elevation. The generation of lift also creates drag, which induces slower speed. The tempered helium system (static lift) and aerodynamic shape (kinetic lift) and propulsion system of Airship would adjust to these conditions.

Aerodynamics of Tether Control Line Models

Generally, the flight of a control line model takes place on a hemisphere. The radius of the sphere is given by the length of the control line. The control line can adjust distance between the Airship and Skycrane/Loadframe and thus the height of each body above the surface. If this system is flying at a constant altitude, the control lines cut a cone out of space. The inclination of this cone can be shown in the figure below as the angle $\Theta$ ("theta"). First, one will have to compute the required lift force and the force acting on the control lines.

Several forces would act on the model of a tethered Airship/Skycrane/Loadframe. For stability, all must be in equilibrium. Unknown are the lift force L and the force E (control line force) acting on the control line to the Skycrane, and a function of the Loadframe's pennants. One thing which is unique to the motion along a circular path is the centripetal force Fc. acting on the Airship and Skycrane. Note that this force depends on the velocity squared, twice the speed and four times the centrifugal force. These forces can be calculated.

The Airship is inclined to the wind at an angle of attack, a, which affects the lift and drag generated by the Airship. Other factors affecting the lift and drag include the wind velocity, the air density, and the downwash created by the edges of the Airship.

Cable Tension

The expression for the cable tension between the Airship and Skycrane/Loadframe shows, that for a given flight speed, long lines and zero elevation ($\Theta=0$) produce the largest forces. For control, there must always be tension on the cables. Thus the force E (control line force) must always be positive, otherwise the Skycrane would "drop into the circle". For a given flight speed, the elevation angle $\Theta$ is limited by the formula. One cannot find an angle where the lines would go slack under these parameters. Due to the selected flight speed and length of the control line, there will always be enough line tension, even if the Airship flies an overhead loop. If we would try to fly higher, the lines would go slack and one would lose control.

Crucial factors, therefore, are maintaining relative position of these two floating bodies and control line angle of attack and length for appropriate tension, in order to minimize or suppress cable oscillations.

Deployment

To deploy the tether control line there must be constant tension. If a tether loses tension during deployment, it becomes slack and its resulting motion is unpredictable. Loss of tension allows such mishaps as the tether jamming inside the reel mechanism or becoming tangled as it deploys. To keep tension on a tether during angular deployment, there should be thrust exerted from the Airship (primary turbofan) and counterweight (Skycrane) in anti-parallel directions along the tether line. A brake needs to be applied along on the reel mechanism to slow down the Skycrane as it approaches the tether end to minimize the bobbing motion. However, it must be noted that this brake does not completely remove the motion, but only minimizes it.

Angular deployment is an unorthodox method, but is an excellent way to keep tension on the tether control line at all times without constant thrusting. It also minimizes the spin of the Skycrane.

Free flight at the end of a tether demands constant attention for safety. During World War II, CG-4A gliders were towed by C47 transports at speeds less than 1.20 mph and had a stalling speed of about 44 mph. Even under tow, the glider pilot constantly had to keep his craft's tether aligned within a few degrees of the tow plane. His diligence produced a cone of safe tethered flight for both the tower and towee called, appropriately, "The Angle of the Dangle." If caught fully loaded in turbulent conditions, gliders were known to disintegrate, spilling their cargoes or hapless troops to the ground far below.

Similarly, modern seaplanes are towed in the air by light planes. When they are released, they climb and soar in the sky, using thermals of hot air.

Tether/Control Line as a Torque

Torque is a measure of the tendency of a force to cause rotation. Torque is a vector too. In physics, torque is a positive vector if it tends to create a counterclockwise turning motion and negative if it tends to create a clockwise turning motion. How much torque one exerts on an object depends on where you apply the force.

Unstable equilibria usually involve a maximum of total gravitational potential energy. When either the Airship or Skycrane tips away from that equilibrium point, the total potential energy starts to decrease and the body accelerates in the direction of the tip. Without a counterforce to stop this motion, it would turn upside-down.

To prevent this undesirable rotation of the Skycrane, the tether/control line requires actively stabilizing the floating bodies and establishing equilibrium. To effect tether dynamics, longitudinal oscillations can be easily and efficiently damped. Lateral oscillations can be probably kept to few percent of the critical value with: smooth retargeting maneuvers and smooth tether reeling.

When the tether control line is pulled, it exerts a torque on the rotating floating body in the direction that restores its stability and lift. This technique provides a dynamic stabilization of the unstable equilibrium.

Although the equilibrium remains unstable, the pulls on the tether automatically exerts a restoring torque that opposes and even overcomes the torque that is trying to flip or spin the floating body. For example, the Airship with keel and control line would provide sufficient torque and thrust to stabilize the entire Skycrane/Loadframe system.

Tether Control Line Dynamics

Recent studies of tether dynamics have shown that when several key technologies are introduced for autonomous and reliable precision applications of a tethered platform(s), the results are: controlled tethered system retargeting strategies in response to different environmental conditions, wind, atmospheric pressure, sea states, etc. in order to control drift, vibrations, oscillations, etc.; precision stationkeeping; very smooth reeling in and out of tether suitable for precision baseline control and altitude adjustment; disturbance rejection of tether lateral modes caused by transient maneuvers; smooth thrust control during retargeting and altitude adjustment; tether long-term survivability; compensation of tether backscatter during laser metrology; robust algorithms to manage tether slackness during retargeting; decoupling of subcomponents motions from tether dynamic noise; and autonomous tether tension and length control logic.

Also, at moderate to high speeds, it is the aerodynamic forces that contribute most to the Airship and Skycrane's motion. Aerodynamic control surfaces like rudders and elevators are attached to the empennage surfaces. Deflection of the former controls the yaw movements (going to the left or right) whereas the latter controls the vehicle's altitude (going up or down). Air jet thrusters help adjust relative position, stability and trim.

Ultimately, the development of various technologies (ultra-strong aereo-elastic fibers and polymer materials, advanced propulsion, etc.), combined with advanced avionics computers systems linked via a WiMax broadband network combined with an Inertial Guidance and Navigation System in conjunction with a IT Flight Control System (Avionics) provide a unique capability to precisely deploy, maintain, reconfigure, and retrieve these tether-connected collaborative vehicles, Airship/Skycrane/Loadframe, with heavy payloads to satisfy the challenges that exist for easier access and speedier delivery or retrieval of very heavy payloads, especially in extreme environments.

Aerodynamics of the Airship and Loadframe

During heavy cargo transfer operations, the Airship and Skycrane would orient into the prevailing wind, i.e. face a headwind. The container ship, on the other hand, would experience wave action to its stem, i.e. would sail in a following sea. The continuous wind direction would provide a vectored force to cock and maintain alignment for the entire multibody system.

An excellent way to consider the aerodynamic forces of the Airship is to fly a kite.

Kites can fly because of the forces act on the parts of the kite. The forces which act on a kite are the same for all kites. These forces act much like those that act on an airliner in flight, except with a kite the tension of a control line substitutes for thrust.

Considering the Airship as a Free Body Model

In a free body diagram, one can draw upon a single object and all of the forces which act on that object. Forces are vectors having both a magnitude and a direction, so one can draw each force as an arrow with the length proportional to the magnitude and the head of the arrow pointing in the direction of the force.

An important property of vectors is that they can be broken down into perpendicular components, so scalar equations can be developed for each component direction.

Now let us consider the Airship in a free body model:

There are three principal forces acting on the Airship; the weight, the tension in the control line running from the Airship to the Skycrane, and the aerodynamic force. The weight W always acts from the center of gravity toward the center of the Earth. The aerodynamic force is usually broken into two components: the lift L, which acts perpendicular to the wind, and the drag D, which acts in the direction of the wind. The aerodynamic force acts through the center of pressure. Near the surface, the wind may swirl and gust because of turbulence in the earth's boundary layer. But away from the surface, the wind is fairly constant and parallel to the surface of the earth. In this case, the lift is directly opposed to the weight of the Airship. The tension of the connecting control line to the Skycrane acts through the bridle point of the Airship where the control line is attached the bridle point along the keel. The tension consists of two components, the vertical pull Pv, and the horizontal pull Ph.

When the Airship is in stable flight the forces remain constant and there is no net external force acting on the Airship, from Newton's first law of motion. In the vertical direction, the sum of the forces is zero. So, the vertical pull plus the weight minus the lift is equal to zero.

$$Pv+W-L=0$$

In the horizontal direction, the sum of the horizontal pull and the drag must also equal zero.

$$Ph-D=0$$

With some knowledge of the Airship geometry and the velocity of the wind, one can determine the value of the lift and drag. And with knowledge of the geometry of Airship geometry and the materials used to make Airship, one can determine the weight. One can then solve the two equations given above for the horizontal and vertical components of the tension in the control line.

Near the bridle point, the line is inclined at an angle called the bridle angle b. The magnitude of this angle is related to the relative magnitude of the components of the tension.

tan b=Pv/Ph, where tan is the trigonometric tangent function.

Knowing the bridle angle, the length of line, and the weight per length of line, one can predict the height at which the Airship flies.

The relative strength of the forces determines the motion of Airship as described by Newton's laws of motion. If a gust of wind strikes Airship, the lift and drag increase. The Airship then moves vertically because the lift now exceeds the weight and the vertical pull, and the tension force increases because of increased drag. Eventually a new balance point is established and the Airship achieves a different stable condition. Because of the change in relative strength of the aerodynamic and weight forces, the Airship also rotates about the bridle point to balance the torques.

Propulsion systems and the tempered helium and pressurized circulation system operating in the Airship/Skycrane/Loadframe system would effect these real world forces. Computer simulation would need to be performed with values for weight, lift and center of gravity etc. for each floating body (Airship/Skycrane/Loadframe) through running calculations in order to determine exact thrust and lift requirements as well as control line lengths for each in order to create equilibrium for precise buoyancy and lift, stability and trim.

Skycrane

The Skycrane Shape: A Delta

The structure of the Skycrane must be lightweight, structurally strong and aerodynamically stable. Its internal structure must be flexible yet possess tensile strength capable of withstanding very strong inertial internal and external loads.

The Skycrane's envelope is composed of a high strength fabric (Vectran®). This envelope surrounds an internal airbeam network that serves as structural supports along with a helium inflated system that adjusts to meet payload requirements. This high strength envelope also protects the airbeam network from vertical wind shear, along with load stress caused by rain.

Structural interplay and deformation to account for dynamic loads are critical factors in considering this airframe's design. Solutions to these challenges include consideration of the Skycrane's interaction with the Airship as well as the Loadframe with suspended external heavy loads and the relational aerodynamic responses. Geometric parameters of this delta wing design are leading-edge sweep, camber and airfoil shape.

The delta shape offers low aspect ratio with high stability at low flying speeds. Because of its high drag performance, it can provide stability for precise station keeping and hovering for "spot on" positioning as well as all weather capability, since crosswinds would have less disruptive effect along the delta's flight path.

Very essential in the flying performance of the Skycrane is the positing of its towing point: this location of the control line, extending from the Airship, is mathematically determined.

To meet these demanding criteria, the Skycrane takes on a modified delta shape or "Flying Wing". This delta shape would offer a strong triangular airframe with spacious internal volume, while providing 360-degree external lookdown coverage for a TV digital camera for computerized visual surveying, Infra-Red (IR) remote sensing equipment for semi-autonomous and vision-based navigation at night, Doppler radar and LADAR.

Aerodynamic studies have shown that this triangular wing shape of deltas in forward flight at subsonic speeds produces less vortex wake and consequent drag.

In reference to weight distribution, deltas allow the placement of controls to the rear, beyond the center of gravity.

The delta shape has been shown to increase propulsion efficiency. As far back as 1914, the Dunne Flying Machine, one of the world's first seaplanes, had increased propeller efficiency due to the plane's delta shape.

Most of all, the Skycrane's delta shape offers optimal structural support for the suspended Loadframe and payload. In reference to lifting capacity of the delta airframe, lift is least affected by an increase in cargo weight. Other proposed delta Airship designs incorporate multiple spheres containing lifting gas and an outer rigid structure that envision useful lifts of up to 1000 tons in cargo transport.

Skycrane Envelope

The envelope of Skycrane is largely structurally independent of the internal framework Because of the deformations and stresses placed on the architecture of the Skycrane, caused by vector forces coming from both external and internal loads, the envelope must be made of an extremely high strength fabric with exceptional creep characteristics. This independence demands that the outer covering be composed of a lightweight advanced high strength fabric, with enough tensile strength to flex and respond to external and internal loads associated with stresses placed upon the geometry of the Skycrane. The answer is Vectran®.

The envelope must be sized to account for theses periodic stresses. These stresses, include the inflation and deflation of helium cells and tubes within the helium circulation system. As the internal helium circulation system inflates or deflates, the envelope must adjust accordingly. For external stresses, such as the pull of Tether Control Line as well as deflections of the suspended Loadframe (with or without payload), The expansive nature of the delta spar of the Skycrane or the airbeam structural framework allows the entire envelope to be maintained in uniform tension overall, providing smooth, structurally rational surfaces, perhaps for further rigidifying. Uniform membrane tension diminishes flapping and mechanical degradation. It also reduces envelope air resistance and drag caused by induced vibrational modes, and it uniformly pre-stresses the compression net.

Airbeams are ultra-strong, fabric tubes filled with high-pressure air. Vertigo Corporation Lake Elisnore, Calif. and Natick. Army Labs Center for Inflatables, in Natick, Mass. have conducted many experiments that show that airbeams constructed of braided fiber provide a safe method to contain the high pressure air. Constructed of a high strength, seamless Vectran® fiber braided sleeve, the airbeam's structural capability is a function of pressure and diameter. Vectran®, with a strength 5 times stronger than steel, is the fiber of choice for this high-pressure inflatable. To fabricate a high-pressure airbeam to support a 100 to 200 ton load, without bending moments, an 8+-foot diameter sleeve is required. For even greater loads, an airbeam with higher tensile strength means a sleeve of an even larger diameter. The air permeability of Vectran® can be adjusted by a thin coating of silicone rubber and its rain-proofing can be accomplished by plasma treatment.

The envelope of the Skycrane and the airbeam network conform more closely to the paths of compression, so tension is minimal, discontinuous, axial, chordal, straight, and geodesic. Tensile elements are apparent and plainly involved in the structure of the Skycrane, but are engaged less visibly.

So to adjust to the substantial external and internal stresses laid upon it, the Skycrane's envelope requires and extra strong and durable advanced fabric, such as Vectran®.

Vectran®

Vectran® is polyester five times stronger than steel and is a liquid crystal fiber manufactured by Hoechst Celanese. Vectran® has a modulus comparable to Kevlar® but due to its molecular composition has better flex and abrasion resistance, although its IJV properties are worse. Vectran® also does not creep. Vectran® fabric has high strength and modulus, retention of properties after flexing and creasing, excellent performance in high and low temperatures, and good chemical resistance.

Skycrane's Internal Framework for Carrying Very Heavy Payloads

Airbeams

The internal structure of the Skycrane is a skeletal network consisting of high-strength airbeams. Vectran® is the fabric of choice for these inflatables. This airbeam network, consisting of air-inflated, high pressure tubes, with diameters of 8+ feet and very great tensile strength is elastic yet possesses substantial tensile strength, capable of withstanding very high internal and external loads associated with heavy cargo transfer, including Loadframe maneuvering and weight shifts, compressed helium transfer and control line vector/torque/thrust from the Airship.

During payload transport operations, with inflated helium cells, the Skycrane can experience a centro-symmetric loading effect by partial depressurizing the envelope. Such a pressure differential further engages the envelope as it is caused to cling to the airbeam frame, in order to form deep, radially inward curves between the curved bights of the frame. These in-curved tensile portions act as structural members to oppose arc deflection, to decrease membrane vibration and to add stability to the Skycrane structure, enabling it to carry very heavy external loads.

The internal framework of the Skycrane or "skeleton" is composed of an airbeam network, i.e. inflatable tubes serving as hoops of large diameter with other inflatable tubes if middle to smaller diameters. These tetrahedral hoops are connected by members running along the length of the Skycrane. This skeleton gives the Skycrane its overall shape and takes all the forces imposed upon it. This structure is strong yet flexible, and as lightweight as possible.

The airbeams of the Skycrane act as hoops possessing sufficient stiffness, strength, and pliability. This radial expansive structure presents optimal compressive paths in response to external loading, which acts to pre-stress and strengthen the entire structure. This design utilises the compressive properties of structural materials to the fullest advantage. It employs in a wide variety of shapes, particularly "pneumatic" shapes and lattices.

Tensions in the airbeam network of the Skycrane are subjugated, as required, to brace, support and pre-stress a compression net that creates an aspect of continuous compression throughout.

The radially expansive nature of the framework of the Skycrane provides a uniform tension to the envelope, providing smooth, structurally rational surfaces. Uniform membrane tension pre-stresses the compression net and diminishes flapping and mechanical degradation. It would reduce envelope air resistance and drag caused by induced vibrational modes.

Within this "skeleton" an internal spiral system of inflatable tubes filled alternately with compressed and uncompressed helium allow for mass flow and inflation and deflation of the helium circulation system needed for precise ballast control, flight control and maneuverability. The buoyancy of the Skycrane adjusts by means of this compressed helium circulation system to offset the weight of the payload it carries, while limiting the Skycrane/Loadframe's overall air resistance and drag to accomplish precise trajectory and flight control over a ship and body of water.

Because the airbeams are air-inflated tubes having strong tendencies toward circularity, flatness, and a larger radius, they comprise a compressive material made of stiff, springy rod or tube (or bundles of rods or tubes) that bend into arcs and are joined to form curved spans of a diameter many times that of an individual arc and very many times greater than that of a bundle or rod. These large airbeams, using the minimum possible compressive material, have lower weight.

For the Skycrane, a tangential connection may be an airbeam attached to the internal framework, extending along the top line of the Skycrane, in order to provide stiffening and structural support for alignment of the Tether Control Line and docking with the Airship. This extra tangent connection serves as an integral spar, to buffer and distribute dynamic loads with maximum efficiency, while providing a towing point and connection for the tether control line as well as a portal for electrical cable and compressed helium circulation system extending from the Airship above.

The airbeam framework can be greatly strengthened by inflation or a supporting tensile attachment. Further strengthening of an airbeam frame is derived from incremental addition of more circumferentially comprehensive tension portions in the form of lines, nets, or fabric, until the frame is maximally braced in full membrane stress. Tensile bracing might consist of only the minimum required to maintain the balanced array of bows, and be achieved by inter-linking arcs, or by tying or lashing points of crossing and tangency.

Skycrane's Internal Helium Circulation System

For active ballast control, a forced helium circulatory system with compressed and non compressed flow is employed between the Airship and Skycrane to adjust each platform's attitude and to control the Skycrane's ballast necessary to avoid the "sling shot effect" and to dampen oscillations after heavy cargo offloading. (See Internal Subsystems below.)

Skycrane Aerodynamics

The Skycrane's delta shape and pliable structure adjusts for helium gasbag volume, altitude control, and maneuverability to achieve precise ballasting and positioning as well as control of center of gravity for itself and its Loadframe beneath to load or off-load cargo at sea.

Slowly positioning the Skycrane/Loadframe/payload over the target area and then suspending the Loadframe/Soft-landing mechanism with payload reduces load inertia and undesirable oscillations. The stiffening of the Loadframe's pennants with high strength fibers, regulating pennants length (for vertical control of the load height when the offloading on an unstable surface and better control of center of gravity) slows the Loadframe's velocity (effecting lateral and forward motion), would help ameliorate such heavy payload motion and unpredictable oscillations near the ship or water's surface.

The IT Flight Control System exploits the natural wind field variation with altitude to generate passive lateral control forces effecting the interactive tether dynamics between the Airship and Skycrane, also bolstered by the tethered-deployed aerodynamic surfaces. The Skycrane uses a retractable Elevon for flight control. Of particular significance is the Skycrane's relative position to the Airship. The Airship's thrust, and the length and angle of attack of the tether control line are factors that can adjust Skycrane's altitude and stationkeeping position, especially in high velocity winds when over a body of water in high sea states.

The Skycrane's own lifting performance is achieved through its delta wing design that takes advantage of the variation in wind velocity with altitude. This delta wing generates a horizontal lift force that can be directed over a wide range of angles for maneuverability. This high-lift wing geometry is characterized by large amounts of leading-edge camber and bluntness, resulting in a high drag penalty, but creating ideal conditions for low speed maneuvering.

Taking advantage of a wind speed or wind direction with height (weathervaning), the Skycrane can change its own vector motion by changing altitude which is achieved through the HE circulatory system. A retractable Elevon placed on trailing edge of the airfoil is used for flight control.

The Skycrane's envelope and airbeam framework can accommodate HE running, through its circulation system that inflates or deflates (expands and contracts) to meet the weight/ballast requirements of the payload. The Skycrane with its suspended Loadframe maneuvers positions above the containership ship below for payload transfer. If the Airship/Skycrane is already deployed and extended overhead within a sea lane, the container ship would position itself below in a following or head sea. Thrusters are employed for stationkeeping, attitude and flight control.

In analyzing the Skycrane's relative motion, there are four major control challenges: non-minimum phase behavior and oscillatory modes at low speeds, time-varying behavior due to altitude variations, and the variable efficiency of the actuators depending on speed. More specifically, regarding the last one, at very low speeds aerodynamic forces do not contribute to the maneuverability of Airship, i.e., the control surfaces have negligible influence on the motion of Airship. In this case, adjusting thrusters and vectoring angle is the main type of actuation.

Skycrane's S-Foil Camber Line May Create Significant Lift by Wing-In-Ground Effect (WIG)

The Skycrane's interface with the Airship's S-Keel creates an S-foil with a high camber line for the Skycrane, a large delta-shaped airfoil. Camber refers to how much the upper edge of the airfoil rises above a straight line drawn between leading edge and tailing edge.

Airfoils create lift by increasing the distance that air has to flow over the top of the wing, compared to the distance it flows under the bottom. To travel the longer distance across the top, the air has to flow faster, which creates less pressure. The pressure difference between the top and bottom of the wing creates lift because the higher pressure on the bottom pushes the wing up into the lower pressure area.

In high-camber airfoils, such as this delta-shaped Skycrane, the distance over the top of the wing is much greater than along the bottom. This creates more lift, but also more drag, which slows the planform. The Skycrane's shape also may create a unique condition when it flies at low altitudes; This shape invokes lift from a "Wing in Ground Effect." Some wing planforms are more stable than others, the reversed delta from Lippisch proved to be very effective for stability. Recent research shows that wing sections with an S-shaped camber line are more stable than conventional wing sections. Many new designs incorporate such an S-foil.

"Wing-in-Ground Effect" has been experienced for years by manned flight pilots when landing aircrafts. Just before touchdown the aircraft will not go lower. The air below the wing is trapped between the wing and the runway, forming an air cushion. The air cushion is best felt in low wing aircraft with large wing areas. This phenomenon is called (aerodynamic) ground effect. From around 1920 on, pilots knew about this strange "ground effect" and sometimes even deliberately used it. The seaplane Dornier DO-X could only cross the Atlantic when it was flying with its hull just above the wavecrests. During World War II, pilots knew that when they lost an engine or fuel on the way back from the enemy that they could reach home by flying just a few feet above the sea, thus needing less power and saving fuel.

Thermals

Similarly, in certain latitudes, this tethered lighter-than-air system during flight can aerodynamically use thermal updrafts to glide like the seabird, the albatross, that itself uses different wind strengths and currents to soar through the air while expending little energy. Modern seaplanes are towed in the air by light planes. When they are released, they climb and soar in the sky, using thermals of hot air.

Express Pickup and Delivery of Very Heavy Payloads by NIST RoboCrane

The Skycrane's design incorporates certain basic elements of a cable suspension system, called a "NIST Robocrane" 106 a proprietary suspended platform and cabling system, with six degrees of freedom (DoF) for various lifting tasks on ships and submarines and in buildings and other large objects developed and tested by NIST (National Institute of Standards & Technology).

The fast-adjusting, reeling NIST RoboCrane's top platform operates from within Skycrane, its bottom platform is attached to the top of the "Soft Landing Mechanism" containing up to six ISO 20' containers pick up and drop-off. In all, this system provide optimal heaviness ratio for balance and stability management of the suspended payload.

The RoboCrane was first developed in the 1980s. It utilizes four upper support points and six computer-controlled winches and cables that enable the platform to move in the direction of, and around, three axes. On each side, a set of three cables hold the suspended platform stable. The computer controls the platform's full motion: side to side, up and down, back and forth, and yaw rotation about a vertical axis while maintaining levelness through the system kinematics and a redundant level sensor.

Two front cable pairs provide platform lift while two rear cables mount lower to pull back on the platform, creating a rigid system. Tension sensors in line with each cable can prevent hoist or platform overloading or sense cable slackness.

Each cable's length is controlled by hoists mounted on the platform. In the prototyped configuration, the Robocrane carries its hoist motors, which provide a stabilising counterweight. The Robocrane moves in Cartesian and joint modes. Cartesian control allows an operator to intuitively move the platform with a tethered joy stick, either worn or mounted on the platform. A computer simulation, rendered in a 3D object, shows the Robocrane's range of motion. The picture plots the maximum extent of the platform's center of gravity. Joint mode allows single hoist motion for cable setup or replacement. The NIST Robocrane design answers question involving the location of the load attachment point has plagued engineers. If the attachment point is too low below the craft's center of gravity, maneuverability must be sacrificed. On the other hand, if the attachment point is too high above the craft's center of gravity, safety must be sacrificed, subjecting the craft to greater risks from undesirable oscillations. Dangerous load oscillations often develop as a result of load inertia and/or movements during flight. Such oscillations can result in load jettisoning or disastrous loss of flight control.

Typically, "heavy lift" helicopters carry their loads on cables or "slings" extending beneath the fuselage of the aircraft. U.S. Marine Corp pilots who fly CH53E heavy lift helicopter often complain that the suspended payload of 18 tons has a tendency "to fly itself" due to forward motion and downwash and other oscillations that produce a "springing effect". Under adverse conditions of high wind or high sea states, suspended heavy payloads tend to become unmanageable due to cushioning effects and venturi reactions.

Theoretically, oscillations generated by slow moving tethered Skycrane/Loadframe, a stable and smaller sized system, with a high density payload, is considerably less than by a fast-moving helicopters with a sling or by a giant hybrid airship with an internal quad-tiltrotor with powerful downwash lowering a payload onto a ship's deck.

The Skycrane/Loadframe system or "Soft Landing Mechanism" is outfitted to interact with the NIST RoboCrane platform. Namely, it offers stability for platform suspended from an unstable reference. The RoboCrane's pennants or cables are woven of ultra-strong fibers, and that its winches are driven by state-of-the-art high speed-reeling, powerful motors, like those recently developed for raising deep-sea elevators.

In the present embodiment, the RoboCrane's cables are stiffened by material made of Kevlar® or Spectra® or PBO or High Performance Poly Ethylene (HPPE) fibers in order to support payload weight and minimize Loadframe oscillations. This cabling system extends down from the Skycrane and connects to the Loadframe or "Soft Landing Mechanism" below.

Skycrane's Soft Landing Mechanism

Loadframe as "Soft Landing Mechanism"

A primary goal of the Skycrane/Loadframe's computer/sensor/actuator system is reactive control, i.e. to anticipate and react to necessary cargo lifting speed, height, and maneuver timing in order to respond to real-time deck angles along with wave heights/intervals and wind speeds effecting the target area below.

A major problem arises of an exact setting down of a heavy cargo under adverse weather conditions. The Loadframe/Soft Landing Mechanism must "spot on" setting down and picking up such heavy payloads, even if the ambient conditions, including winds and wave action may not allow either the Skycrane or containership to keep steady.

Dynamic responses of payload transfer system, specifically the load that the lifting system is transferring, is of paramount importance in the cargo transfer operation. The Loadframe's relatively compact size with high density payload (six ISO 20' containers) serves to stabilise the RoboCrane's cabling system and prevents oscillations.

Moreover, the Skycrane and its suspended, mechanized Loadframe and soft-landing mechanism's compact size allows it to move quickly and reduces time required to safely load/offload the payload.

A crucial factor is the Loadframe's lifting speed. As the Loadframe approaches the containership, it is required that the lifting speed during load transfer shall be higher than the maximum vertical speed of the waves. The reason for this is obvious, since the vessel may collide with the suspended payload if the lifting speed is too small.

To avoid the possibility of a lifted payload impact with the deck or cargo on the deck, the Skycrane and suspended Loadframe must be powerful enough to quickly compensate the relative motion between the lifting system and the payload.

The Loadframe's interaction with a ship being tossed by winds and must be fast-reacting and therefore employs "Soft Landing Mechanism," a mechanical and pneumatic device. This suspended payload system offers shipboard motion compensation by using computer assisted control, sensors, automated rigging control, a rigid frame, air inflated gasbags, to follow relative motion and cushion the cargo/Loadframe.

This multibody system design is designed to lift and deliver up to as many as six ISO 20' containers at once during payload transfer between ships underway at sea. In the present embodiment the Skycrane operate with a Loadframe or "Soft Landing Mechanism", from an unsteady frame of reference, ultimately to safely and quickly perform this task. Such a Loadframe relies upon computerized robotics software and modeling to achieve active ballast control, stability and trim.

One of the first considerations is the Loadframe/Soft Landing Mechanism's structural shape. The outcome is clear almost from the beginning. The standardized transport dimension in used today is the container. This allows only two choices: either a 20- or 40-ft container to be used as the dimensional basis for Loadframe. After careful consideration, the best solution is to choose a structure to accommodate for the standard 20-ft container.

The Soft-Landing Mechanism looks like a large rectangularly shaped box with tubular frames, possibly made of a composite materials or aluminum lithium alloy. Being slightly larger than a horizontal ISO 20' container, this framed, tubular box is capable of lifting and/or delivering up to six ISO 20' containers at once.

Having an open tubular structure and open bottom, this framed box would perform a "Slip and Tuck" maneuver by slipping over and securing the six stacked containers.

The payload would be "tucked," cushioned and protected by a surrounding inflatable air bag system—"a soft landing mechanism" embedded within the suspended framed box's tubing. Air pressure possibly could be provided through a hose running from ballonets in the Skycrane above.

The bottom ISO container (the container nearest to the cargo area deck) would be secured by tight fastening to the box frame by means of a hydraulically powered, horizontally oriented, cable winch.

Especially if the box frame tilts due to the Skycrane or ship's rolling, pitch or yaw and does not exactly align or meet along parallel lines, this pneumatic air-bag cushioning device would be deployed to further surround, secure, buffer and stabilise the contents within the box frame. This pneumatic air-bag cushioning device would determine, adjust and compensate for motion and angular incline of the Loadframe relative to the cargo deck. This inflatable air bag system with adjustable high pressure air flow and pressure gauges subsequently would absorb shock during load transfer and thus protect the internal payload and its surroundings. Made of nonporous fiber/textile (with very high tensile strength PSI and stiffness) this modular and durable air bag system would absorb vibrations caused by sudden motion and angular incline changes of the moving bodies by modulating its adjustable air pressure. Using internal pressure gauges, the modular air bags would buffer and cushion the load frame by inflation or deflation thus protecting the cargo and flight deck.

Laser Sensors (LADAR), Doppler Radar and even DGPS mounted in the Loadframe would measure distances and relative positions before, during and after contact, and thus enable a state-of-the-art computer program to determine the box frame's exact position relative to the payload for inflation/deflation requirements. Using Cartesian mathematics, this computer program would utilise 4th degree polynomial graphs, with adjusting coefficients of x. $x^2$ or $x^3$ to simulate the boundary surface of air bag, box frame and containers and cargo deck, and determine the exact time for load-on or load-off.

Essentially the use of a soft landing mechanism serves as a load stabiliser by adding structural rigidness during cargo transfer, thus preventing and reducing oscillations.

Through this method, all six ISO 20' containers then could be lifted and transferred at once.

A further mechanical consideration of this proposed Soft Landing Mechanism is the need for integrating small, lightweight, motor-driven air blowers to provide inflatable air. These blowers would need to sustain flow and pressure rise in a small package size. Increasing the rotational speed presents several technical challenges, namely bearing life and motor heating. The motor heating issue is further compounded by the fact that reducing the size of the motor by running at higher speeds, yet the amount of shaft power required to be output by the motor remains the same. This results in a much higher than typical power density motor, and with the reduction in surface area, a much higher heat flux is required to maintain stator temperatures. This problem can be resolved in one of two ways: increase the efficiency of the motor and reduce the amount of heat generated by it, or increase the heat transfer capability of the stator and motor housing.

Rapid deflation and retraction and storage of the airbags occurs upon prior to setting down and release of the containers.

A roll on/roll off (Ro/Ro)/ramping system can be added to the design at the Loadframe/soft landing mechanism's base to quickly allow deployment of cargo/ISO containers or rolling stock, perhaps using fork lifts or straddle carriers, across a cargo deck area.

In lower sea states, (Sea States 4 and less), the Skycrane/ "Soft Landing Mechanism" offer an optimum container-handling solution, with precision, speed, cost efficiency, fuel economy and protection heavy containers.

Operations of this nature can occur on containerships or Offshore Supply Vessels (OSVs) or offshore oil rigs or barges, as well as the flight decks of amphibious assault ships and Navy transports or Army lighters, multihull connectors envisioned for seabasing operations.

The Skycrane's flexible structure is adjusted by HE inflation/deflation to fix the weight offset ballast requirements of the payload it carries. The suspended Loadframe and soft landing mechanism, suspended by the RoboCrane's reinforced cables from the overhead Skycrane, minimizes the overhead operating airspace needed for precise point to point cargo transfer.

In reference to safety, the use of a Loadframe means that the loading/unloading process aboard a commercial cargo ship or a U.S. Navy vessel or even an oil platform does not necessarily have to cease for security/safety reasons. The Loadframe's smaller size, lessoned air resistance (lower drag) improves control and maneuverability and creates less physical risk or interference to a ship's superstructure, and flight deck (radar, antennas, onboard cargo and crew below.)

The "Soft Landing Mechanism" exploits the rigidity and strength of the Loadframe, along with the impact resiliency and durability of high strength fabric and the natural impact absorption capabilities of an inflatable structure.

Interoperability with Smaller Vessels

In high sea states, Airship/Skycrane may employ a hook and sling. Wave motion compensation in Sea State 5 and above must be robust and faster for smaller ships. The reason is under these conditions, smaller vessels have greater relative motion than larger vessels, like containerships. Thus in very high sea states it become impracticable to employ the Loadframe with smaller craft.

Internal Subsystems (Achieving Relative Motion Situation Awareness (SA) Between All Subcomponents of the Multibody Aircrane System)

"Fly by Wire" Communications:

Wireless Broadband Network

A wireless broadband network is an ideal communications system for applications that require high volume, data intensive traffic, within a radius of up to one mile, with multiple subscribers, including all subcomponents within the multibody system: Airship, Skycrane, Loadframe and containership or supply ship, to integrate sensors and actuators, and the computer controlled IT Flight Control System.

WiMAX is a state-of-the-art standards based wireless technology that provides high-throughput broadband connections. (WiMax is short for Worldwide Interoperability for Microwave Access.) Low network investment costs and non-line-of-sight (NLOS) operation over radio spectrum make WiMAX an excellent communications base for this special "Fly by Wire" Multibody Aircrane.

On the ocean's flat surface, this microwave communications system is not blocked by significant physical obstacles. Given its dielectric properties, the conductivity of the salt air may even enhance signal and connectivity of the WiMAX wireless system. Rain and snow however, can inhibit connectivity.

WiMax offers data encryption and access control security in accordance with NSA standards. Intel is working with the wireless industry to drive deployment of such WiMAX networks.

WiMax broadband technology features reliable Internet speeds similar to cable broadband connections, and for this at-sea application with high data intensity can operate wirelessly to a greater numbers of users/subscribers over a radius of one mile. The ocean environment itself, with a reflecting surface for WiMax technology, offers better coverage for transmission. A WiMAX tower station can connect to the Internet using a high-bandwidth, wired connection via a ship-based WiMAX tower, using a line-of-sight, microwave link. A connection to a second tower (often referred to as a backhaul), along with the ability of a single tower to cover up to 3,000 square miles, allows WiMAX to provide coverage to remote ocean environments. Through stronger line-of-sight antennas (located within the Lighter-Than-Air bodies), the WiMAX transmitting stations send data to WiMAX-enabled computers or routers set Up within the this integrated wireless network of sensors and actuators, to facilitate a semi-autonomous flight control of the multibody air-crane. The B-2 Stealth "Flying Wing" achieves flight control and stability by employing hundreds of system computers that run hundreds of calculations per second. Grid computing can achieve much the same results. A new application of WiMAX is now just emerging—one that has great potential for use in providing broadband access to Grid computer sites. AT&T and other long distance carriers have been interested in using WiMAX to extend their long haul private line and broadband data networks (e.g. n.times.DS1, Frame Relay, IP-VPN, Ethernet/ VLANs). In doing so, the long distance carriers would reap considerable savings on operating expenses (OPEX) that they eliminate wired access lines and equipment (e.g. repeaters, remote terminals and central terminals). For internet and other non-data intensive applications, the maximum range of transmission is thirty miles. Using three-layer computer software architecture, (like that incorporated in UAV flight), the entire Airship/Skycrane ultimately is controlled and operated by a single trained operator/software engineer, given override commands, operating on-deck with an on-board laptop.

High-speed wireless broadband technology based on the IEEE 802.16 standard opens access for Internet service and mobile phone subscribers. The flexibility of wireless technology, combined with the high throughput, scalability, long range service coverage. WiMAX extends operating range (4.94-4.99 GHz, 5.25-5.35 GHz, 5.47-5.72 GHz, and 5.725-5.85 GHz) and exclusive channel structure (5, 10, 20, or 40 MHz-wide channels) for maximize configuration, flexibility and enhance system design, in order to optimize spectrum usage and data throughput, while providing superior data, video, and voice services for all subcomponents within the entire Multibody Aircrane network.

Mobile Robotics Software

Robotics software in complex mobile systems stands as an integral component of this invention. Coordination of the dynamic vehicles within the multibody system, Airship and Skycrane, as well as Loadframe payload is accomplished through spatially distributed tasks, with software validation and control provided through a mobile station base.

The next generation of intelligent robotic and software agents is characterized by being more general than the current generation—in at least three respects. First, they are able to successfully carry out multiple, diverse, and possibly interfering tasks in changing and partly unknown environments. Second, they can improve their performance by autonomously adapting their control software for the kinds of tasks they are given and the environments they are to operate in. Third, they are able to robustly perceive a substantially larger part of their environment.

These aspects of generality cannot be achieved without the robots being capable of planning their intended course of action based on foresight and without them being able to autonomously learn better control routines from experience.

Mobile robots operating in a sea based environment can now be able to perceive and react to the activities in their surroundings. Knowledge about the environment, for example, derived from the templating or profiling of ships, enables the robot to improve its navigation behavior.

Over the past few years methods for tracking multiple moving objects with a mobile robot have been developed and can be applied to multibody systems like the Airship/Skycrane. These methods use sensors and motion models of the objects being tracked in order to estimate their position and velocities. The estimation process is based on efficient particle filtering techniques, which are able to cope with non-linear object dynamics as well as partial occlusion of objects. With these methods it is possible to keep track of the motions of objects in the vicinity of a moving robot and determine the relative location of other objects.

DARPA's (Defense Advanced Research Projects Agency) Urban Challenge, a contest offering a $2 million prize, will place autonomous robotic cars in an urban environment and expects them to navigate in accordance with the standard rules of the road and in response to unexpected driving conditions. This contest comes on the heels of DARPA's Grand Challenge, another contest with a $2 million prize, that was an autonomous robotic car road race across the Mojave desert in 2004 won by Stanford's IT team with their all terrain robotic vehicle named "Stanley."

Robot action planning is a computational process of generating and revising high-level robot control programs based on foresight. A goal is to equip autonomous robot controllers with robot action planning capabilities that enable them to perform better than they possibly could without having these capabilities. Our work on robot action planning concentrates on three aspects: Methods for robot action planning, such as Probabilistic, Prediction-based Schedule Debugging; Realistic models for symbolically predicting concurrent reactive robot behavior; Runtime plan adaptation for autonomous robots.

Recent UAV (Unmanned Aerial Vehicle) software developments have been applied in Athena Technologies "GuideStar" flight control and navigation system. has contributed to the successful first flight of Aurora Flight Sciences "GoldenEye 80" UAV. The design and embedded capabilities of the GoldenEye 80 enable the UAV to be used for a variety of military missions, from conducting surveillance beyond hills in rural areas to gathering intelligence while flying between buildings in urban warfare operations. The GoldenEye 80 is being developed under contract to the DARPA through its Organic Air Vehicle (OAV-II) program.

Near future research focuses on hierarchical extensions of these methods which will enable mobile robots to assess the dynamic situation they are in, including the interactions between objects and the robot. This information will then be used to optimize the robots navigation plans.

For at-sea cargo transfer operations, the core issue is the "tuning" of relative motions of the Airship/Skycrane and Loadframe, the cargo and the ship.

A proposed six-degree-of-freedom air-based crane concept could control the container load, withstand the forces imposed, and compensate for the relative motions—in conditions of up to Sea State 5 (SS5). IT Flight Control System The IT Flight Control System establishes the physical coordination between the Airship and Skycrane/Loadframe and containership and ancillary sensors and actuators, by integrating software with spatially distributed tasks, equipped with 3-layer software architecture. This software architecture works like NASA's Atlantis system used in mobile robotic vehicles, and employed in Unmanned Aerial Vehicles (UAVs).

The complexity of the robotic system being developed requires a deliberative-reactive intermediate-level process control and communications architecture, where different subsystems can run independently and as separate threads, while able to exchange information and activate or inhibit each other. Using a Task Control Architecture offers a convenient structure to handle multiple subsystems running, in a distributed computing environment.

Commands would be sent through this distributed sensing network that abides by a number of network control laws. Stability and convergence motion algorithms would be used. Various mathematical techniques could be employed that have proven useful in solving motion coordination problems, among them ergodic and circulant matrices from matrix analysis, graph Laplacians and algebraic connectivity from algebraic graph theory, graph grammars, symmetries of differential equations and nonsmooth and stability analysis for differential inclusions.

The control law of this mobile robotics system depends on neighbors, and becomes an interaction law between vehicles. Utilising a Tether Control Line would greatly simplify these calculations by computers in the IT/Communications/Flight Control System (and increase operational safety). With relative distances, size, speed and positions measured and known, algorithmic computations to determine flight path, motion planning and motion control of each vehicle, either for the Airship or Skycrane, become more exact, so probable error is reduced and interoperable safety is increased.

An object of this IT Flight Control System equipped with 3-layer software architecture would be the ability to perform mission, navigation, and sensor deployment planning and execution, failure diagnosis and recovery, and adaptive preplanning of mission tasks based on real-time evaluation of sensor information and constraints on the Airship/Skycrane and its surroundings.

The onboard control and navigation subsystems are responsible for sensor data acquisition and actuator control, based on flight profiles uploaded to it from a nearby mobile base station serving as a computer/operations center. The Airship/Skycrane's hardware consists of an onboard computer, microprocessors, internal sensors, and actuators. The software consists of a 3-layer architecture.

The software architecture consists of a 3-layer structure, combined with a high-level data flow programming method and system development environment.

As Airships have relatively large time constants, at the lowest level a soft real-time operating system based on a reduced Linux kernel can be used.

As the higher-level, overarching control structure, a layered, multi-rate approach similar to the ATLAS architecture would be employed, to allow nested control cycles to be run at progressively lower speeds, but at increasing levels of competency.

The top level, a shared supervisory one, decides on which control algorithm is to be activated, its set-point, and the related actuators, depending on which is the current flight part—take-off, cruise, turning, landing, hovering, etc. At the intermediate level, control algorithms with different gains are available; they command the actuators based on decisions taken on the top level. At the bottom level, actuators provide the means for maneuvering the Airship along its course. The microprocessor is responsible for sending all sensor readings to the computer, and for sending commands to the actuators.

Robustness of the overall "herd" system of these two floating bodies, Airship and Skycrane, with container ship, is evaluated at two different levels: at the intermediate level, ensuring that each control algorithm is robust to modeling errors and external disturbances, such as winds and wave actions; and at the top level, ensuring that the control algorithms and related actuators are robustly selected, and ensuring bumpless transfer between them.

This navigation system is designed to use sensors. The internal sensor suite used for flight path execution purposes includes both inertial navigation sensors: compass, accelerometers, inclinometers, and gyroscopes, and a GPS (global positioning system) receiver. Digital and Infrared (IR) Cameras mounted on the Airship and Skycrane would have the purpose of providing aerial images to the operator on a command ship for both day and night operations, and serving for visual/imagine navigation based on physical features of the container ship or target zone for payload transfer.

External sensors: atmospheric, inertial, positioning, and imaging sensors, as well as internal sensors: Micro-Electro-Mechanical Systems (MEMS), required by the vehicle would be sequenced to accomplish its semi-autonomous navigation tasks. Proximity gauges (Laser Range Finders) or LADER or Doppler radar would be employed to measure speed and distances. Mission sensors are those selected for specific aerial data-gathering needs, such as a GPS receiver. Data from these sensors would determine errors between "should hit" and "did hit" flight path data, and to insure corrections by fast-reacting actuators.

As for hardware, a compass, inclinometer, and DGPS receiver are directly connected, via serial ports, to a laptop PC computer.

All other control, navigation, and diagnosis sensors (engine speed, altitude, control surface position, wind speed, accelerometers, fuel and battery level, and engine temperature) and actuators (engines and control surfaces) would be connected to a microprocessor. The microprocessor is responsible for sending all sensor readings to the computer, and for sending commands to the actuators.

A remote control unit, to override the commands sent to the actuators, is devised.

This control and navigation system depends crucially on accurate information regarding the Airship/Skycrane's exact position in six-degrees-of-freedom (DoF) with respect to an Earth-fixed reference frame. A continuously updated estimate of the system's position and pose is obtained through a state estimator, implemented as a Kalman filter, having as inputs the sensor data collected from the inertial sensors and the GPS receivers, and as output of the continuous optimal estimate of the Airship/Skycrane's relative position, velocity, time and navigation requirements.

Computer simulation software of at-sea cargo transfer operations for deck-based cranes already has been developed. MSC Software has created a software package called ADAMS to define all parts of a lifting system, including masses and inertial properties, defining forces acting on or between the parts, and constraining the motions of the parts to each, or not at all. ADAMS develops the equations of motions of the system from the model and then solves the equations numerically in the time domain. The output of this dynamic modelling program is the solution of the equations, through which any force acting through the system or motion of any part can be obtained.

Trajectory Calculations

The primary function of a IT Flight Control System is to calculate the real-time position of each component within the Multibody Aircrane to maintain its relative position and heading. A variety of further sub-functions are also included such as track-follow and weathervane modes, but the control of position and heading is fundamental.

Any object has six freedoms of movement; three rotations and three translations. In a lighter than air vehicle they can be illustrated as roll, pitch, yaw, surge, sway and heave.

The "control" problem must be addressed using avionics software, sensors/actuators/propulsion systems and aerodynamic designs that are lightweight, strong and flexible.

The Airship along with the Skycrane and suspended Loadframe, together with the containership below are represented as one multibody system. The trajectories of the floating bodies: Airship and Skycrane/Loadframe, all operating at varying altitudes, can be determined by computer simulation. Their trajectories can be controlled by a Trajectory Control System (TCS). The TCS provides bounded and underactuated control of flight trajectories, and each bodies drift in the winds, a non-uniform external flow field.

A remote control unit, operated on deck by a sailor with a laptop computer, contains direction and override commands that can be sent to the actuators, as needed. The local human observer/computer operator (sailor) situated next to the deck's target area to share operational control with the Skycrane/Loadframe, so that the operator can indicate broad directions to follow while the control system makes sure the local trajectory is followed correctly, or even allow the operator to take over system control in case of unforeseen events; bumpless control transfer between the operator and the control system; and approaches to deal with unforeseen problems, such as communication degradation or loss.

All components in this multibody system are subjected to forces from wind (the containership is subjected to waves and tidal movements as well as forces generated from its own propulsion system and other external elements). The response to these forces is dynamic movement, resulting in changes to the position and heading of components in the Multibody Aircrane. These changes are measured by the position reference systems and gyro compasses. The IT Flight Control System calculates the offsets between the measured values of position and heading, and the required (or setpoint) values, and calculates the forces that each component must generate in order to reduce the errors to zero. In addition the IT Flight Control System calculates the wind force acting upon the component, and the force required to counteract it based on the model of the Multibody Aircrane held in the computer.

Previous field experiments conducted by NOAA Smart Balloons using LaGrangian modeling have demonstrated that computer modeling and analysis can simulate actual wind conditions. A LaGrangian frame of reference, one that moves with the flow of the atmosphere has been used for many years to track pollution and monitor the evolution of a parcel of air in the atmosphere. NOAA has devised windload model simulators to predict wind loads, shear and motion affecting smart balloons. This wind load simulation software may be effectively incorporated and modified for the Airship/Skycrane's IT Flight Control system to simulate wind velocity and ocean conditions.

Modeling and filtering enable a dead reckoning/or "DR" mode (often called "memory" to operate if all position references are lost. Each component will continue to maintain position automatically, although the position-keeping will deteriorate with the increasing length of time since the last position data received. In practical terms, this means that the computer operator/flight controller does not need to immediately select "manual" control upon the loss of all position reference. Kalman filtering and fast digital data transmission ("data highways") offer station keeping accuracy.

A main concern to the Computer Operator/Flight Controller is the number of computers, their methods of operation, and the level of redundancy they provide.

The computers may be installed in single, dual or triple configurations, depending upon the level of redundancy required. This system communicates via a wireless broadband network which may incorporate many other control functions in addition to the IT Flight Control System.

The IT Flight Control computers are dedicated specifically for the flight control function, with no other tasks. A single-computer system, or "simplex" IT Flight control system provides no redundancy. A dual or two-computer system provides redundancy and auto-changeover if the online system fails. A triple or triplex system provides an extra element of security and an opportunity for 2-out-of-3 voting.

Position Reference Systems

Accurate, reliable and continuous position information is essential for positioning. The IT Flight Control System requires data at a rate of once per second to achieve high accuracy. Reliability is, of course, of vital importance, to operations where life and property may be put at extreme risk through incorrect position data.

The number of position references enabled depends on a number of factors. In particular, the level of risk involved in the operation, the redundancy level that is sensible for the operation, the availability of references of a suitable type, and the consequences of loss of one or more position references.

A variety of position reference systems can be used by IT Flight Control System. The most common are: differential global positioning (DGPS), taut cables in the NIST Robocrane, and line-of-sight laser or microwave systems. The reliability of position references is a major consideration of all components in the Multibody Aircrane. Each has advantages and disadvantages, so that a combination is essential for high reliability.

Position information from position-reference systems are received by the IT Flight Control System in many forms. In addition, the type of co-ordinate system used may be cartesian or geodetic. The IT Flight Control System is able to handle information based on either co-ordinate system. A Cartesian, or local, coordinate system is based upon a flat-surface two-dimensional measurement of the North/South (X) and East/West (Y) distances from a locally defined reference origin. This reference origin will be taken from one of the position reference systems. IT Flight Control Systems 'pools' or combines, position reference data for each vehicle from two or more position reference systems. If only one position reference system is enabled into the system then it is simply checked, filtered and used. If two or more are available, then the system needs to use both equally or according to their individual performance.

The IT Flight Control Systems weights the average option. Individual position references are weighted in inverse proportion to the variance or "spread" of position data; the higher the weighting for an individual position reference system, the greater the influence of that system in the position calculation.

Inertial Guidance & Navigation System

An inertial guidance system consists of an Inertial Measurement Unit (IMU) combined with a set of guidance algorithms and control mechanisms. The entire system also is referred to as an "inertial platform." This inertial platform allows the path of each component of this Multibody Aircrane (Airship, Skycrane, suspended Loadframe—with or without payload—and, if necessary, cargo ship)—to be controlled according to its relative position as determined by the inertial navigation system (INS).

Gyroscopes measure the angular velocity of each subcomponent of the Multibody Aircrane in an "inertial reference frame." By using the original orientation of the subcomponent in the inertial reference frame as the initial condition and integrating its angular velocity, the subcomponent's current orientation is known at all times.

By measuring the linear and angular acceleration of each subcomponent, and establishing its relative "inertial reference frame", the INS can recalibrate each subcomponent's relative position, velocity, orientation, and angular velocity. The result is inertial navigation for the entire multibody system. It refers to no real-world item beyond itself.

INSs have angular and linear accelerometers (for changes in position); some include a gyroscopic element (for maintaining an absolute positional reference). Angular accelerometers measure how a vehicle is rotating in space. Generally, there's at least one sensor for each of the three axes: pitch (nose up and down), yaw (nose left and right) and roll (clockwise or counterclockwise).

Linear accelerometers measure how a vehicle is moving in space. Since it can move in three axes (up & down, left & right, forward & back), there is a linear accelerometer for each axis.

To control "drift" or mathematical errors in this open loop system, INS's are now usually combined with satellite navigation systems through a digital filtering system. Control theory in general and Kalman filtering in particular, provide a theoretical framework for combining of the information from various sensors. One of the most common alternative sensors is a satellite navigation radio, such as GPS.

When combined with GPS, an inertial navigation system (INS) operates as a precise clock. A computer continually calculates each vehicle's current position. First, for each of six axes, it integrates the sensed amount of acceleration over time to figure the current velocity. Then it integrates the velocity to figure the current position.

The inertial system provides short term data, while the satellite system corrects accumulated errors of the inertial system.

As this Multibody Aircrane operates near the surface of the earth, its inertial guidance system must incorporate "Schuler tuning" so that each vehicle will continue pointing towards the center of the earth as a vehicle moves from place to place. Schuler tuning provides the inertial platform of a navigation system with a feedback loop between its velocity output and its stabilizing gyros such that it behaves as though it were such a pendulum. This makes it remain vertical as the vehicle moves from place to place on the surface of the earth.

Localization

Local Reference Position Coordinates

For the IT Flight Control system to handle earth-referenced type of data it is necessary to configure a system to accept geodetic data, or global references, such as GPS.

Digital Global Positioning System (DGPS)

A DGPS system provides co-ordinates in terms of latitude and longitude referenced to the WGS84 datum. Most offshore operations are conducted using UTM (Universal Transverse Mercator) as the chart or work-site diagram projection. This reduces the positional coordinates into Northings and Eastings in meters.

Using Digital Global Positioning System (DGPS) technology, the Multibody Aircrane is programmed to home-in on a target and to provide a relative position reference to the ship. The Loadframe and the ship is equipped with DGPS navigation for better alignment. For navigation and flight path trajectory planning, the Skycrane/Loadframe is outfitted with a LADAR (Laser Detection and Ranging) system and a Digital Television/Infra Red Camera and Doppler radar for speed measurements to prevent lateral and/or proximity misalignments. Using this system cargo transfer could take place day or night. To counteract sway, this target management control system provides for absolute control in six degrees-of-freedom.

The need to continually monitoring of flight path trajectory of each vehicle, in order to avoid collision, leads to the computation of an appropriate loci of observation and consequent adjustments of the height of the Skycrane/Loadframe along the reference trajectory, in order to reasonably accommodate the constantly changing Center of Gravity (CG) position, a characteristic which is unique to Skycrane/Loadframe flight, the motion has to be referenced to a system of orthogonal body axes fixed in the vehicle(s) with the origin at the Center of Volume (CV). The CV is also assumed to coincide with the gross Center of Buoyancy (CB).

The computer controller can select the type of presentation on his console required, e.g. Cartesian, geographic (lat/long or UTM). If the latter, the system will automatically calculate the UTM zone from received geodetic position measurements. The datum is usually selectable from a menu.

DGPS has become the most commonly-used position reference for many at-sea operations. The US Department of Defense (DoD) Global Positioning System (GPS) is in widespread general use, with typical accuracies available from the GPS Standard Positioning Service (SPS-civilian access) of 20 m (68% RMS or 1 sigma). Prior to May 2000 the DoD applied a further downgrading known as "selective availability" (SA), which reduced SPS accuracy to values around 100 m. SA has been switched off, but the DoD reserves the right to re-apply it. Even without SA, GPS accuracy is not adequate for payload transfer between ships.

In order to improve GPS accuracy to levels useful for this purpose, differential corrections are applied to GPS data. This is done by establishing reference stations at known points on the WGS 84 spheroid (the working spheroid of the GPS system). The pseudo ranges derived by the receiver are compared with those computed from the known locations of the satellites and reference station, and a Pseudo-Range Correction (PRC) derived for each satellite. These corrections are then included in a telemetry message sent to the ship's receiver by a data link. The receiver then applies the PRCs to the observed pseudo ranges to compute a differentially corrected position.

Differential GPS systems are provided on-board by a service provider. The provider maintains and operates a network of reference stations worldwide and will install receiving equipment on-board to access the services.

Network DGPS

Most DGPS services accept multiple differential inputs obtained from an array of reference stations widely separated. Generally, network DGPS systems provide greater stability and accuracy and remove more of the ionospheric error than obtainable from a single reference station. Network systems are more comprehensively monitored at the hub or control stations, where user information or warning data may be generated and sent out.

Network DGPS Configuration

For payload transfer operations, a local WiMAX link and relative GPS solution can be the best arrangement.

The accuracy obtainable from DGPS systems is in the area of 1-3 m dependent upon the distances to the reference stations, ionospheric conditions, and the constellation of satellites available. DGPS tends to be less reliable in close proximity to large structures (i.e. platforms) due to interference with satellite and differential signals. DGPS performance near the magnetic equator has suffered due to scintillation (sun spot activity causing ionospheric disturbances). This reached a peak in 2001 with the maximum of the 11-year sunspot cycle.

Relative GPS

The Multibody Aircrane concept requires the relative positioning Airship and Skycrane and Loadframe relative to a moving structure, i.e. container ship.

An Artemis and a DARPS system (Differential, Absolute and Relative Positioning System) are configured to handle this problem. For the measurement of relative position by GPS, differential corrections are not needed, as the errors induced are the same for the Skycrane as they are for the container ship. A DARPS transmitter on the container ship sends the received GPS data to the WiMAX system. The IT control computer then calculates a range/bearing from the container ship's stern, which is put in to the IT flight control system as position reference. The relative GPS (DARPS) system yields position information reduced to range/bearing data from the container ship itself. The prime consideration is the clearance distance from the container ship so that the collision risk is minimized. A heading reference may also be available from multiple GPS receivers.

Heading Reference

Each lighter than air vehicle's heading is provided by one or more gyro compasses, which transmit data to the IT flight control system. For redundancy, multiple gyros are fitted.

If three gyros are fitted to any one subcomponent, then the IT flight control system may use two-out-of-three voting to detect a gyro failure, and give an appropriate warning to the computer operator.

Environment Reference

There are three main environmental forces which cause the components in this multibody system to move away from its setpoint position and/or heading. They are the forces created by wind, waves and current. Generally, the ocean current forces change slowly, so that integral term of the controller is adequate. However, a facility exists in the system for "quick current update" or "fast learn" This is a function which reduces the time constant of the integral term and allows the mathematical model build-period to be radically reduced. This is intended to allow the system to better react to rapidly changing wind, wave or tidal conditions or the other new conditions after a large change of beading.

This is to allow compensation to be applied to all the various position reference sensor inputs for their offset from the Center of Gravity (CG) of each component. Instrumentation measures and provides these values in the form of a vertical reference sensor (VRS), vertical reference unit (VRU) or a motion reference unit (MRU). The MRU measures accelerations by the use of linear accelerometers and calculates inclination angles.

The IT flight control system utilizes two or more DGPS receivers with antennae mounted some distance apart. The GPS fixes and motion-sensors provide data on each vehicle's position, heading, roll, pitch and heave values. This is able to provide a reference for position and heading as well as motion in and about each axis.

The IT flight control system has wind sensors. This data is used to calculate wind-induced forces acting upon each vehicle's hull and structure, allowing these forces to be compensated before they cause a position or heading change. Typically, a wind sensor consists of a simple transmitting anemometer, usually of the rotating-cup type.

The direction of the wind is particularly important for the Airship and Skycrane that need wind to orient along the same axis, or find the minimum power heading. A correct assessment of this heading is vitally important to these vehicles.

The wind sensors are important because large changes in wind speed or direction can cause major disturbances in the positioning if they are not selected or shielded. The wind feed-forward allows an immediate compensatory thrust to be applied in direct proportion to the change detected in the wind speed and/or direction.

A wind compensation facility within the manual joystick control function, provide the computer operator with an environmentally-compensated joystick control option.

Laser-Based Position Reference

LADAR or Lasar Range Finders determine distance to a target reference. This system locks onto a single target and/or a number of targets on the structure, from which position must be maintained. Light pulses are sent and received so that range and bearing can be measured. Ranges vary according to weather conditions, when the systems will be affected by reduced optical visibility.

Tether Control Line Management System (TMS)

The Skycrane is deployed directly from the Airship by a tether management system (TMS). The IT flight control system can be put into a "follow Airship" or "follow Skycrane"

command node for this tracking work, where transponders on each vehicle becomes a relative position reference.

Use of the tether control line allows the Airship and Skycrane to "weathervane" in the same direction. Weathervaning allows aerodynamic lift of the lighter than air vehicles during payloads between ships underway at sea. It also provides an effective means of Skycrane stationkeeping for precise point to point transfer of very heavy cargoes between itself and two ships underway at sea. Moreover, the Tether Control Line supports the helium circulation to provide active ballast control during this payload transfer operation. It is essential, therefore, that tension be maintained on the Tether Control Line. Tether Control Line tension values are communicated to the IT flight control system to update thrust and maneuver commands to the Airship and Skycrane to maintain tension, position and heading.

At the Airship's bridle point, the tether control line is held by a number of tensioners. The tensioners control the movement of the line, maintaining a set tension on the line sloping downwards. Tension on the line is needed to prevent tether control line damage from buckling or line oscillations. The set tension ensures a smooth reeling or unreeling of line as the Skycrane maneuvers and positions over a container ship.

Tether Control Line operations are particularly dependent upon environmental conditions. If they are not able to weathervane, both the Airship and Skycrane must have power and propulsion capabilities be able to effectively cope with wind conditions from most directions, while maintaining tension on the Tether Control Line.

Situation Awareness (SA)

Ultimately, the Multibody Aircrane acts like an airborne robot. In this case, the Multibody Aircrane can be controlled by a human, an operator with a portable laptop computer. Human-robot awareness and interaction, therefore, becomes of major concern in this type of semi-autonomous flight. For humans to work with robots in an airborne multibody system, the robots need information about the environment along with other robots in the team, as well as relevant instructions from humans. In this case, the already performed research on UAV (Unmanned Aerial Vehicles) and Situation Awareness serves to establish the types of information needed. Such baseline information includes 3D spatial relationships between humans and Airship, Skycrane, NIST Robocrane, suspended Loadframe and cargo ship(s); points on Earth; other aircraft/surface vessels/vehicles; surface areas such as terrain or ship's profile; target area(s); predicted 3D relationships of all subcomponents; nearby weather, wind, atmospheric, tidal, wave conditions; health of all platforms/systems within Multibody Aircrane; operating parameters/status of all subcomponents/systems; internal programming; logic and failsafe programming of all subcomponents; Multibody Aircrane's mission; Multibody Aircrane's progress in completing mission; degree to which the Multibody Aircrane can be trusted; human comments necessary to direct all subcomponents of the Multibody Aircrane; and human-delineated constraints that may require a modified course of action or command noncompliance.

Multibody's Aircrane's Power and Control System

Airship and Skycrane Turbofans:

The Airship's propulsion and control system is comprised of primary and secondary jet power engines. In this case, adjusting the power thrust and vectoring angle is the main type of actuation.

The Airship's primary power jet turbofan provides thrust and primary momentum in forward flight, tether control line tension to effect the Skycrane's altitude during its relative stationkeeping to ships underway at sea. The primary turbofan is positioned at the tail.

Placing the weight of the primary turbofan engine at the Airship's tail end stabilises the whole Multibody Aircrane, since this location constitutes an approximate center of mass for the entire system.

The Airship's primary power jet propulsion engine requires high power, perhaps as powerful as the GE90 turbofan. Specifically designed for the Boeing 777, the GE90-115B recently set a new world record for thrust totaling 127,900 pounds of thrust.

The Airship and Skycrane require vectored thrust. Vectored thrust, which is simply a rotation of propulsion units about a horizontal axis, provides thrust in the direction desired. For example, using vectored thrust, i.e., deflecting the vector thrust of turbofans downwards, helps stabilize the Airship and to bring it into alignment with the Skycrane. In addition to main turbofan engine, the Airship must have well-positioned thrusters to control position. Typically, a modern Airship will have as many as six thrusters; three at the bow and three aft. Forward thrusters tend to be tunnel thrusters, operating athwartships. Two or three tunnel thrusters are usually fitted in the bow. These thrusters can be mounted on pylons on either side, along the length of the S-keel; they are positioned perpendicular to the body of the Airship, and are used for stabilizing, trim and maneuvering at lower speeds.

Airship's Power Plant/Propulsion

For propulsion and electricity generation, the Airship's power plant must produce a maximum power generation capacity on the order of sixty-six megawatts (88,500 hp). In order to achieve this high power requirement and reduce fuel weight, a Brayton Turbine Cycle/Thermoacoustic Engine (TAC) is employed.

For the Airship application, a gas turbine-TAC combination embodies a combined-cycle power plant. The Fellows Research Group (FRG) TAC offers greater fuel efficiency and lighter weight over other gas-steam engine designs, so its incorporation in a gas turbine-TAC combined-cycle (Brayton-TAC) power plant maximizes this configuration's power to weight ratio.

The combined-cycle plant provides ultimate fuel efficiencies in the 55%-60% range, whereas a gas turbine alone has efficiencies only in the 25%-30% range. This combination effectively reduces the Airship's fuel inventory weight by half, or doubles its operational time per unit mass of fuel.

The TACs are used as secondary power units, running off the high temperature turbine exhaust, that results in such high fuel efficiencies and reduces fuel consumption to about 21,350 lbs per hour. Fuel efficiency is much greater (>35%) using the FRG TAC generators as primary, direct-fired units, and its specific power is much better than other TAC engines.

Typical exhaust temperatures for gas turbines are in the 500° C.-550° C. range. With a super-alloy HXh, the TAC likes a delta-T in the 500° C. range, so the mating of the two engines is ideal from the aspect of normal operating parameters.

The TAC reduces the thermal output of the turbine by converting about 35% of the exhaust effluent energy to electrical power, and dumping the remainder to a cold-side heat exchanger (HXc). The total combustion gas mass-flow remains the same, but the temperature (thermal energy amplitude) of the final exhaust (and subsequent gas volume) is reduced.

The conversion efficiency (electrical output) of the TAC varies as the delta-T across it. It needs a reasonably constant HXc temp in order to maintain output. An acceptable weight/ efficiency trade-off advantage is created by a buffer helium heat storage cell that provides a relatively constant thermal sink for the TAC and an on-demand intermittent heat source to moderate temps of a superheated helium gas bag system. This interim helium gas bag serves as a coolant for the TAC (by directing the TAC thermal effluent to heat an interim helium bag gas). This produces an acceptable weight/efficiency trade-off advantage to using a buffer heat storage cell, in order to provide a relatively constant thermal sink for the TAC and an on-demand intermittent heat source to moderate or cool temps in the superheated helium gas system. When necessary, atmospheric air also can be used to cool the TAC.

This waste heat is directed to a superheated helium gas bag system, used to control and stabilize the Airship's buoyancy thermally. Flow values for this subsonic structure with high Reynolds numbers must be maximized for stability and trim.

The remaining gas turbine exhaust produces a large heat inventory is in the neighborhood of 500 million Btuh that, as required, is diverted directly to the superheated helium gas bag system to control and stabilize the Airship's buoyancy thermally.

FRG TAC engines feature a 25 kW test cell unit weighing about 55 kg, but can be built heavier if necessary, for testing purposes. Production equipment is lighter, about 1.5 kg/kW. FRG intends to develop a space qualified system that weighs less that a kg per kW, using a mix of carbon composites and high strength alloys.

With current FRG TAC designs, armature mass limits power output to somewhere around 25 kW per unit. This power output is produced in a fairly compact manifold system, but requires 2,640 (25 kW) units, and a fuel flow of about 33,500 lbs of JP-8 per hour. About 3 MW can be produced in a cabinet with a 24'.times.6' footprint.times.10' high. About 24 such cabinets, with about eight feet of service aisle between cabinets, laid out in two rows of 12 cabinets per row, would create an engine room of about 60' times 168'. This configuration can be made more compact, if necessary. Incorporating skid-mounted gas turbine generator sets has the same space and fuel requirements.

The electricity produced from the TAC system is used to run compressors and pumps that connects a two-way hose the run down the tether control line, in order to control displacement for the Skycrane below.

When the Airship and Skycrane are coupled together in forward flight or during cargo transfer operations, the gas turbines exhaust can be directed to propulsion, thrust and station-keeping requirements.

This usually means having the engines, and their associated propellers, being able to swivel up or down, with reverse thrust being sometimes also possible. Bow and/or stern thrusters have also become widely used, since they provide fine control features for the landing and docking operations.

Skycrane's Propulsion and Power System

Power requirements for the Skycrane/Loadframe is a direct function of throughput and motion compensation, along with air-resistance tolerances (Reynolds numbers) and aerodynamic requirements.

The Skycrane has a minimum electrical power benchmark of 420 kw. The Skycrane has much smaller turbofan engines along with a configuration of Thermoacoustic Engines (TACs). The turbofans less power and fuel requirements than the Airship's primary turbofan. Each of the Skycrane's two turbofans are positioned on the windward side of the delta wing, and each located along the leading edge near each the wing's but straddled underneath, alongside the hull.

During payload transfer operations, however, should the Skycrane use turbofan propulsion more vibration, more noise and turbulence results; Also fuel consumption increases and creates more fire risk. Therefore, having the Skycrane maneuver by more passive means is far more preferable, i.e. by tether control line torque adjustment, through wind flow and aerodynamic lift (the Skycrane uses an Elevon for flight control), and adjustments to helium density and buoyancy force via the helium circulatory system.

The primary purpose of the Skycrane's turbofans is to provide thrust and stability to the Multibody Aircrane in forward flight. As secondary power, the Skycrane's turbofans support the Airship's primary turbofan when the Airship and Skycrane are coupled together.) But the Skycrane's two turbofans also can provide, as required, vectoring thrust for the delta shape to quickly maneuver and stabilise over ships during cargo transfer operations.

This arrangement reduces the Airship's parasitic power requirements, and, in general, reduces fuel requirements. The Skycrane's primary power loads are thrusters, pumps, compressors, heat exchanger, and NIST Robocrane with cables and winches carrying Loadframe and cargo.

Buoyancy & Active Ballast Control

Airships Superheated Helium

Another aspect of this invention is to include superheated helium in the Airship's design to improve its maneuver performance, and control of static buoyancy, lifting capacity and stability. A computer controlled tempered helium system particularly addresses the Airship's substantial ballasting needs. As importantly, when the Airship and Skycrane operated in concert with a pressurized HE circulation system, this technical innovation can effect center of gravity, and oscillations and tension of the tether control line between the two floating bodies. Obviously, the introduction of a tempered helium system invokes the thermodynamics principles of non-steady, internal flows at subsonic rates, pressure exchange at high and low rates, valving and volume control, compressed and non compressed HE storage cell design, A consequence of incorporating a superheated HE cells (perhaps in both the Airship and Skycrane) would be to substantially reduce the physical size of each floating body, while maintaining a substantial buoyancy force and lifting capacity.

Located above the Airship's S-keel, approximately at midships, and within the envelope, to the stern, a grouping superheated helium inflated cells and air inflatable ballonets, are separated by a stiffened diaphragm. This system would provide for the majority of the Airship's lifting capacity.

Airship's Tempered Helium System

A superheating helium system placed within the Airship offers substantial altitude and active ballast control for this floating body. Ceramic fabrics are available now: at higher TL's than TL7, it is possible to seal them and provide the light-weight insulation (like aerogels) to contain lift gases heated to 1000-1500° C. can provide substantially increased lift. The rarefied helium approaches the lifting capability of a gasbag containing pure vacuum. Cold helium provides about 83% of the lift of a vacuum cell, while helium at 1500 C provides about 97% of this life. Heat loss could be reduced by lining the outer cell walls of the heat exchanger as well as outer tubes and storage bags with light weight insulated fabric, with high performance ceramic fabric such as 3M's Nextil, the fabric used in NASCAR races.

To circumvent the problem of carrying heavy ballast to prevent excess lift or venting helium when descending, it makes perfect sense to heat or cool at least a part of the Airship's lifting gas. Hot helium can provide substantially increased lift, stability and trim. Furthermore, this lifting gas acquires a temperature significantly higher (or lower) than that of its surrounding air.

Ray Rapert, in his Masters Thesis (NAVAL POST-GRADUATE SCHOOL MONTEREY CA., 1987), found that basic heat transfer empirical and analytic equations can be applied to an Airship concept that uses heated helium in the inner envelope to augment and/or control gross lift. The convective and conductive terms lead to a linear system of five equations for the concept Airship/Skycrane with the nonlinear radiation terms included by an iterative solution process. He used a FORTRAN program to perform otherwise tedious calculations, and graphed results for variables of interest. These indicate that the simple use of Airship engine exhaust heat will give more than a 30% increase in gross Airship lift.

The Airship and Skycrane both experience a natural phenomenon called "superheat". This phenomenon occurs when the floating bodies have had long exposure to direct sunlight and/or make a rapid ascent through the atmosphere. The resulting lifting gas expansion usually generates a relatively fast increase in the buoyancy force. This phenomenon sometimes becomes quite a nuisance for the steady control of the vehicle.

The process for the tempered helium system works as follows: Hot air exhaust from the onboard turbofans engine is pumped to a heat exchanger. Buoyancy through thermal heating of HE requires a large and potentially heavy heat exchanger to provide significant lift advantage, and unless HE heating runs as high as 500 degrees F. or more, thermo/convection systems have relatively slow process times.

The cold helium to be tempered is injected via a blower from helium storage bags to a heat exchanger.

A helium storage cell filled with a minimum volume of at least 200,000 m3 of cold helium would be available to be tempered.

The Airship's superheated HE system always run hot. It is regulated and tempered to adjust to specific lifting requirements, largely reducing the time consuming problem of forced flow HE convection by heat transfer through an absorber heat exchanger. Convection heat transfer values are very specific to the Airship's geometry and the configuration of the superheated HE system.

Concentrated within a core area in the Airship, along a longitudinal beneath the envelope, the location is selected to effect optimal control and lift of the entire Airship/Skycrane system. The superheated HE gasbag system is positioned at a concentrated core point, along the Airship's vertical center line (along the center of gravity, center of buoyancy, metacenter). The specific location of the Airship's superheated HE gasbag system is determined by Center of Gravity (CG) as related to Center of Volume (CV) specific measurements to maximize stability, trim and control. The CV is also assumed to coincide with the gross Center of Buoyancy (CB).

One third of the Airship's entire HE gasbags supply is available for superheating. The gasbags are made of ceramic, insulated fabric, (thus protecting nearby subsystems, equipment, envelope etc.) The superheated HE would be set to at a specific temperature/pressure/volume ratio. By regulating temperature, superheated HE provides stability and trim for the Airship's entire structural load.

According to physics, the buoyant force acts on the object at the center of gravity of the displaced air. This point is called the center of buoyancy. For the object to float, the center of gravity and the center of buoyancy must remain in a vertical line so that there is no net torque acting on the floating body causing it to rotate. In the equilibrium position of the floating object, the vertical line passing through the center of gravity is called the center line of the object and is fixed with respect to the body. If the floating body is displaced from its equilibrium position, the center of buoyancy shifts in the direction of tilt while the center of gravity and the center line remain unchanged. The vertical line through the center of buoyancy now intersects the center line at a point which is called the metacenter. If the metacenter lies above the center of gravity then the torque acting is a restoring torque. This makes the object regain its original equilibrium position. This is termed stable equilibrium.

Within the Airship, the superheated HE system, and ballonets are computer controlled and radio linked to MEMs/actuators to measure, coordinate and address lifting and equilibrium requirements for the Airship and Skycrane under ambient atmospheric conditions (local temperature, air pressure and humidity).

Located along the Airship's keel, a heat exchanger is connected on each side by tubes: On one side, a tube sending hot-air exhaust from Brayton Turbine Cycle/Thermoacoustic engines and on the other side, a tube sending cold helium from a lower HE storage cell. Alternatively, High Temperature Heat Exchangers of lightweight and compact size now are being developed. For example, UC Berkeley has a concept for a liquid-silicon-impregnated carbon-carbon composite for high temperature heat transport. It is anticipated that molten salt corrosion will not be a significant design issue for these heat exchangers. But resistance to helium permeation, materials compatibility and ASME code certification are required before this advanced system could become available for commercial use.

The Airship's non permeable HE storage bags are attached above the an inner layer of inflated air bags shaped to match the HE gas cells shape structure and inflated and stiffened to prevent fabric crimp and flutter during the HE inflation/deflation process.

The turbofan engines are mounted internally and are air cooled. Their waste heat goes to heat the helium, further increasing lift. At higher altitudes, an outside heat vent may not be needed. Under emergency conditions, a vent could be used for landings.

Heat insulation is not conventionally provided upon Airship envelopes, because the areas are so great, and the lift provided by helium is so weak. Even very light insulation would be a losing proposition except in the case of an extremely large craft (square-cube law). In the case of the Airship/Skycrane, it becomes practicable to provide an insulation layer for the tempered helium system. Fabric SIGRA FLEX Industrial Graphite Insulator, a lightweight fabric used in exhaust nozzles of NASA's Space Shuttle booster nozzles, may be appropriate material to protect the internal subsystems and envelope. Carbon composites are generally used to exploit their retention properties at very high temperatures.

Heating helium for about 15 minutes (sea-level) or to about 35 minutes for altitudes below pressure height creates additional gained buoyancy.

Conversely, for a light Airship/Skycrane at cruising altitude, helium may need to be supercooled. The Airship's Thermo Acoustic (TAC) Engine provides electricity for the refrigeration unit. Coolant provided by this heat exchanger and a blower send super-cooled gas for about 20 minutes to give a loss of buoyancy for easier maneuvering.

The additional buoyancy force for the total Multibody Aircrane, both the Airship and Skycrane, could vary considerably when traveling through high or low pressure regions. Using superheated LIE enables the Airship (and the tethered Skycrane) to travel with less dynamic lift, i.e. lesser resistance losses which results in less propulsion requirements fuel consumption, reduced envelope stress and higher safety.

The Airship's tempered HE system provides buoyancy for stability, trim and ballast control. But such a tempered HE system works on mass transfer of a superheated gas, convection within a closed-loop internal system having non-steady, laminar/turbulent flow under high temperature and high pressure regimes, along with heat exchangers and gasbags.

The Airship's superheated HE system is designed to provide stability, trim, and lift for the total multibody system, especially during payload transfer operations when pressurized HE is siphoned off from the Airship along a circulation system away via a two-way hose (attached to the tether control line) to the Skycrane below.

In other words, the Airship's superheated HE System and the separate HE circulatory system running between the Airship and Skycrane combine to effect buoyancy and lift for active ballast control. Of course, other factors working into the equation is kinetic lift of each floating body and propulsion.

Helium Circulation System

Between the Airship and Skycrane, a Helium Circulation System is introduced to provide active ballast control, buoyancy, stability, trim for better flight maneuver control. The system operates through a computer software architecture connected to several types of sensors and actuators in order to determine the exact volume, temperature, pressure and location of pressurized HE gas needed to be pumped, exchanged and circulated within and between the Airship and Skycrane.

A primary goal of this HE circulation/distribution system is to compress and decompress flow in order to obviate the need for external ballast, while allowing the Airship/Skycrane to be of more compact physical size (enhancing propulsion, maneuver, stability, trim, and active ballast control.)

Pressurizing helium atoms in a circulatory system will decrease gas volume. High pressure or compressed HE can be used to force flow through the circulatory system's feeder lines and positive expulsion bladders, much like the Appollo/Saturn rocket system that used helium to pressurize the propellant tanks.

Consequently more HE atoms could be moved though out the circulatory system, in order to quickly respond to stability, trim and control needs. The volume of an ideal gas is inversely proportional to its pressure. If the pressure on the gas is increased, the volume of the gas decreases. Also, the volume of the gas is directly proportional to the absolute temperature. Adding helium atoms will raise the pressure inside the circulatory system. More helium atoms will increase weight and decrease volume.

The mathematical expression of that behavior is called the "ideal gas law" because all gases obey the same law at pressures and temperatures. Specifically, P.times V=gm/MW times R times.T. Here are the units for each of these quantities. The pressure "P" is expressed in atmospheres (1 atm=760 mm Hg); the volume "V" is in liters; the amount of gas is the mass (or weight) in grams "gm"; the molecular weight is MW (for helium MW=4); and the temperature "T" is expressed in Kelvins [T (Kelvins)=t (Celsius)+273)].

Laminar Flow

Helium, like water or air, does not like to change direction quickly. Of course, helium has less density than air, so helium will change direction more easily than air. However, abrupt changes in direction generate turbulence, which restricts flow volume.

Laminar flow (parallel, layered, non-turbulent flow) that does not make abrupt changes in direction results in maximum flow volume through a conduit. Such flow is not always possible, but every effort should be made to keep flow as laminar as possible.

Maintaining Laminar Flow

Laminar or smooth flow tends to occur at lower flow rates through smaller hoses or pipes. When determining the consequences of flow rates in pressurized gas systems, it is important to select the appropriate type of dispersion model. For released gases which are lighter than or equal to the ambient air density, Gaussian dispersion models may be used. The greater the pressure differential between the high pressure and low pressure areas, the faster the flow will be.

Pneumatic Feeders

Pneumatic feeders are presently used on a grand scale in agricultural silos to transfer grains by means of pressure differentials.

Pneumatic conveyance of helium utilises a blower to move pressurized cold helium through high pressure hoses from one chamber (gas bag) to another. Helium may be moved through the hoses by either negative or positive air pressure. In both of these cases, through the use of a blower, a difference in pressure is caused to exist between the feed point and the delivery point. With the feed point at a higher pressure than the delivery point, the helium moves to the point of lower pressure.

The use of the pneumatic system with compressible flow between the Airship and Skycrane can produce a pendulum-like effect. As the Skycrane descends, the Airship receives HE through an umbilical four-way hose system. Accordingly the Airship naturally would rise.

This system would feature non-permeable HE Gasbags, along with Gas valves and two-way non rebreathing valves. These valves would have 3 ports: inhalation, exhalation and the mouth. They allow separation of exhaled and inhaled helium for collection and lift or descent of either the Airship or Skycrane. The valves would be radio controlled by MEMs technology. Instrumentation for velocity, and pressure measurements are incorporated such as a laser Doppler Velocimetry System, a multi-channel Constant Temperature Anemometer (CTA) system.

Reestablishing Buoyancy by Diffusing Compressed HE within Gasbags

In determining relative length, size and proportions of this multibody system, the golden mean is applied: two thirds Airship to one thirds Skycrane. About two thirds of the Airship's gasbags and all of the Skycrane's gasbags are connected to the forced HE circulatory system.

Buoyancy is proportional to the volume of the balloon (again, assuming some of the other quantities are not changed). The Airship's gasbags contain HE at ambient and superheated temperatures.

This entire gasbag system, using integrated computer and radio-controlled MEMs/actuators, would compute, combine and coordinate the separate lifting requirements of both superheated HE and a pressurized HE circulation system of the Airship/Skycrane under ambient atmospheric conditions (local temperature, air pressure and humidity). A primary purpose for this system is to obviate the need for external ballast, while allowing the Airship/Skycrane to be of compact physical size (enhancing, propulsion, maneuver, stability, trim and control)

The atmospheric pressure is greater at lower altitudes. Flying at low ceiling heights, approximately at mean sea level (MSL), this Airship/Skycrane would use the compressed HE circulation system for maximum effect to conserve HE and efficiently transfer heavy cargoes at sea. The difference in buoyancy force for HE under ambient temperatures in low and high altitudes can vary as much as 10-15%; when using superheated or pressurized HE at MSL this lifting capacity increases.

During cargo transfer operations, this pressurized HE smaller volume, drawn from gasbags made of elastic, nonpermeable fabric is pumped down in sufficient volume to the Skycrane, and expanded to precisely meet it's exact lifting, stability and trim control requirements.

Skycrane's Gasbag and HE Circulation System

A primary purpose of the Skycrane's design is avoiding the "sling shot" effect after payload drop-off. In order to prevent the "sling shot" effect, the Skycrane must utilize large volumes helium and rapidly transfer of a high volume of HE from its gasbag system to the Airship above, in order to achieve equilibrium of its buoyancy force (lift) for stability, trim.

A principal design point for the Skycrane is to create a flexible structure that effectively "breathes" helium, i.e. has the ability to inhale and exhale large volumes of helium in order to quickly respond to the immediate lifting requirements of the entire Multibody Aircrane.

The rapid compression of helium enables localized neutral buoyancy, (especially synchronized to coincide with payload load-off operations) while at the same time maintaining stable equilibrium.

As already mentioned, the buoyant force acts on an object at the center of gravity of the displaced air. This point is called the center of buoyancy. For the object to float, the center of gravity and the center of buoyancy must remain in a vertical line so that there is no net torque acting on the floating body causing it to rotate. In the equilibrium position of the floating object, the vertical line passing through the center of gravity is called the center line of the object and is fixed with respect to the body. If the floating body is displaced from its equilibrium position, the center of buoyancy shifts in the direction of tilt while the center of gravity and the center line remain unchanged. The vertical line through the center of buoyancy now intersects the center line at a point which is called the metacenter. If the metacenter lies above the center of gravity then the torque acting is a restoring torque. This makes the object regain its original equilibrium position. This is termed stable equilibrium.

Compression

Compression of HE and compressible flow are a key factors in achieving buoyancy, payload management and flight control.

Utilizing positive displacement and diaphragm compressors provides an effective means for compressing helium to regulate buoyancy and lift. A number of compression chambers and multiple compression stages combine offers a means of controlling buoyancy and lift of both the Airship and Skycrane. A receiver receives and stores the gas in a compressed condition. Compressing the gas and transferring it from one inflatable compartment into the receiver effectively reduces its lifting force. This method utilizes a series of inflatable compartments for containing helium and circulating it at high and low pressure gradients, to achieve fast helium transfers or fills A computer analysis of basic ambient characteristics of HE at mean sea level (MSL) is integrated into this program for helium flow program with standardized convection gradients and flow under pressure regimes. The helium circulation system circulates compressed HE flow between the Airship and Skycrane by way a high pressure, flexible, reelable, four-way hose would produce adjustable buoyancy.

Skycrane's Rapid Helium Compression System

For the Skycrane, managing rapid helium compression in order to attain a state of stable equilibrium can be accomplished by a number of methods. Simultaneously employing these compression methods reduces overall compression time for a high volume of helium, in order to quickly regulate and establish local ballast control.

One method to achieve this is for the Skycrane to receive or send large volumes of helium from or to the Airship (via a four-way hose). The Skycrane's offn HE gasbag system is made more efficient by this method.

The Skycrane receives or sends mass flow of compressed or uncompressed HE to or from the Airship, and transports it through a number of strategically situated ducts with valves. This method effects the Skycrane's entire buoyancy force (lift) for stability, trim, etc during payload transfer operations.

Another method to establish active ballast control is for the Skycrane to internally compress its own helium. The architecture of this HE gasbag and circulation system is vitally important for effective of helium compression. To form the shape of a spiral structure is an efficient arrangement for this HE gasbag and circulation system.

The spiral structure, utilizes an unusual "tube in tube" architecture that creates a natural condition for "self compression." Located along the center line of the delta structure, the Skycrane's helium circulation system forms of a spiral structure. Such a spiral structure allows the Skycrane to quickly attain neutral buoyancy at its metacenter located above the Center of Gravity (CG) (along the center line running through the spiral). In this reference to statics, in order to reasonably accommodate the Skycrane's constantly changing Center of Gravity (CG) position, the motion of the vehicle has to be referenced to a system of orthogonal body axes fixed to the Skycrane's origin at the Center of Volume (CV). The CV is also assumed to coincide with the gross Center of Buoyancy (CB). This helium circulation system itself responds to external torque changes by taking into account changes and adjusting localized temperature, volume and pressure.

Formed of coiling tubes, this spiral structure allows helium to run in one directional flow. These inflatable tubes form a series of discrete sections along a general low to high pressure gradient.

Within each inflatable tube, there exists a secondary variable displacement compartment made of Polyurethane, that itself contain compressed helium. Along the entire length of this spiral structure, these internal variable displacement compartments are linked end on end to establish localized helium compression inflation, lift, stability and trim. Their expansion compresses the helium within the outer tube, which in turn is constricted by the spiral structure.

This assembly features end on end connections run throughout the entire spiral network. One set of diaphragm valves links the outer tubes for low pressure or decompressed helium management. The other set of diaphragm valves links the internal variable compartments high pressure or multistage compression management. When linked at specific points to supplement incoming or outgoing HE flow from or to the Airship, (via the Multibody Aircrane's helium circulation system), this entire spiral structure is computer driven and regulated by sensors, actuators such as seals, pumps, compressors, valves, etc. to simultaneously reduce processing times at multiple points and manage multi-stage localized compression and/or decompression of high volumes of helium within the Skycrane. In turn, this localized ballast control (by the rapid compression of helium), can actively adjust buoyancy and restore torque after offloading a very heavy payload.

The variable displacement compartments are made of a nonpermeable, ultra-strong, resistant and elastic material to contain and withstand the force of compressed HE. High strength yet elastic polyurethane film have been used in NOAA Smart balloons. These bladders have a very low permeability to helium without any special polymer treatment and provide flexibility and elasticity.

Polyurethane is a unique thermoplastic material that offers the elasticity of rubber combined with the toughness and durability of metal. It has a higher load-bearing capacity than conventional rubber. It is also weather resistant, with outstanding resistance to oxygen, ozone, sunlight. This ultra-tough material has excellent flex memory, and better abrasion and tear resistance than conventional rubber. Polyurethane commonly used for grain silos. Compared to plastics, urethanes offer superior impact resistance, while offering excellent wear properties and elastic memory. Inexpensive and capable of being molded into large forms and structures, Overall, it is an ideal nonpermeable material for use as the Skycrane's internal, expandable or contractible, HE compression chambers.

In sum, Skycrane's internal helium circulation system primarily consists of a plurality of inflatable tubular structures fabricated in a spiral structure made of Vectran®. Each of these inflatable cells stores a volume of uncompressed helium to provide a fixed buoyancy force and lift to overcome the dead weight of the Skycrane. Variable displacement compartments, located within the inflatable cells, contain compressed helium, used to vary the lift, stability and trim in order to create active ballast control.

But this helium circulation design also allows the Skycrane to "breath" either compressed or uncompressed helium, by either "inhaling" or "exhaling" helium in high volume to establish active buoyancy and ballast control.

Vacating compressed HE from the Skycrane's gasbag and helium circulation system to the Airship via three-way valves and the interconnecting four-way hose further helps the Skycrane establish buoyancy lift, stability and trim. De-pressurizing the Skycrane remaining compressed HE reasserts localized buoyancy force, while providing sufficient weight and lifting capacity for general load management.

When pressurized HE is sent to the Airship from the Skycrane, enough gasbag storage capacity is available within the Airship to de-pressurize and diffuse the incoming IE. Regulation and adjustment of the Airship's HE superheated system (i.e. raising or lowering helium temperature) provides stability and trim during this process.

Following cargo transfer operations, the Airship stays aloft, subject to its own propulsion control requirements and ballast/ballonet system, while it collects and stores the Skycrane's excess HE.

Sensors and Actuators

Regulating the Helium Circulation System's Volume/Temperature Density/Pressurization Sensors are vital in measuring this helium circulation system with actively varying dimensions and conditions would include a laser Doppler Velocimetry System, a multi-channel Constant Temperature Anemometer (CTA) system, and instrumentation for heat transfer, velocity, and pressure measurements. Sensors and computer computations determine the combined and individual performance of the helium circulation system and the superheated helium system to account for localized events such as flow-separation, flutter, instabilities and transient behavior. If the adverse effects of such local phenomena can not be eliminated through novel science-based passive means (e.g. local design modifications), application of local active control is the only recourse. In order to achieve local active control, distributed sensors/actuators and/or passive devices comparable in scale to the local events and able to withstand the harsh environment are used. Micro-Electro-Mechanical-Systems (MEMS) can provide a means to this end but consideration must be made for bandwidth limitations of available sensors/actuators, and their susceptibility to harsh environments. The object of this investigation would be to develop a novel science-based design with enabling technologies for the effective utilization of high-temperature MEMS and other micro-devices for the active and passive control of incipient phenomena in such a tempered HE transfer system. The development of such technology would lead to an order-of-magnitude performance improvement in heavy lift Airship design.

Pipe-In-Pipe (PiP) Construction for Flexible Four-Way Hose System

For the helium circulation system to transfer large volumes of compressed and uncompressed helium between the Airship and the Skycrane, (in order to maintain active ballast control, stability and trim of each floating body) a reelable, bundled four-way hose system, capable of maintaining laminar flow at varying hose lengths, is introduced. Such a reelable hose system runs from the Airship to the Skycrane, along the same angle as the tether control line. The entire hose length must be flexible and lightweight for aerial use, corrosion resistant, damage tolerant, able to sustain high and low pressures, low creep, yet strong enough with internal reinforcing to withstand the extreme stress of long extension, while maintaining mass flow assurance between the two floating bodies. Lastly, it must be controllable by adjusting its length by reeling.

Essentially this four-way hose system is supported by its own tension and an OCS (Overhead Catenary System) where the overhead tether control line supports the length of the four-way hose system. The tether control line supports the four-way hose. The tether control line is hooked to the four-way hose by a series of cable loops. Each cable loop has a hanger with inner rollers at its top that hooks onto the tether control line to provide support. Through this hanger-roller method, the tether control line can be reeled in and out, to any desired length, and still provide support for the four-way hose.

At the bottom of each cable loop, the bundled four-way hose is surrounded and encased by a set of rollers attached to the cable loop. This arrangement allows the four-way hose to reel in or out.

Spacing of the cable loops for support of the four-way hose is accomplished by a series of pincher/release mechanisms, each part of a laser trigger relay system.

Above each bottom roller's housing, a pincher/release assembly is placed to respond to a laser proximity gauge (LADER) relay system. The system is computer controlled via radio signals. Commands for measuring and distancing of cable loops are sent from the computer to each cable loop's pincher/mechanism via radio signals. An opening command releases the pincher from the four-way hose, (reeling in). A closing command attaches the pincher to the four-way hose (reeling out). A LADAR and radio stationed above the righting arm's trackway, where the four-way hose reels out or into the Airship, constitutes the first station in this relay system. Each pincher/release mechanism can measure its relative distance to its nearest neighbor along the line using its own LADAR.

Herding the cables loops, by selectively closing the pinchers of two cable loops, (i.e. the pinchers of the two end cable loops within a given group) at a specific point along the four-way hose, creates a stow position for the cable loops. An isolator, protruding from the bottom rollers, prevents collisions of cable loops when in close proximity.

Within the Airship, the problem of paying out or in a bundled four-way hose to a given length, stopping the hose at a specific point, and then introducing recalibrated pressure and mass flow for laminar flow, requires an automation of functions with a minimum of moving parts.

The first component to be considered is the bundled hose design. The reason for a four-way hose configuration is to create hose diameters of varying size—large and medium—in order to maintain smooth laminar flow of compressed and uncompressed helium in both directions. After payload drop-off, for example, the large-size line is dedicated to sending uncompressed helium from the Skycrane to the Airship. Before payload transfer, medium size line transfers compressed helium from Airship to the Skycrane.

On the larger scale, the entire four-way hose system relies on Pipe-in-Pipe (PIP) construction like that used in LNG transfer operations. The bundled four-way hose has a maximum length of 500 to 900 feet, for safe distancing of the Airship and Skycrane.

This Pipe-in-Pipe (PiP) construction requires inner layers that are thin, flexible, lightweights without joints and extremely hydrophobic, since water paths caused by rain must not penetrate through the material. The outer layers must be rigid enough to withstand the force caused by closure of the pincher/release mechanism (that support the hose length). The most inner layer should be made of a material that helium cannot permeate. Its external layer should be strong and durable. Each hose must be flexible, yet strong enough to withstand the extreme stress of long distance extension while maintaining mass flow assurance between the two floating bodies.

The Airship's reeling motor and hose carousel are located within the Airship, atop its S-keel, at midships, placed parallel to the Airship's length, near the bridle point for the tether control line. Within the Airship, the hose line reel out from a carousel to a trackway with rollers that ultimately extends the four-way hose through and beneath the S-keel and on to a retractable rigid righting arm extending underneath the Airship. When in operation, this righting arm swivels with the four-way hose running along its trackway along a 36 degree axis, maintaining hose tension. The rigid righting arm is equipped with hinges to allow the hose line to respond to the Airship's relative or sudden motion caused by its weather-vaning, heave, pitch and roll.

Adjusting the four-way hose length and then introducing mass flow at that given point calls for a unique design. Specifically, each hose possesses a series of air-tight ports, spaced at different lengths, each port having an ellipsoid shape. These air-tight ports are spaced at pre-determined locations but varying distances along the PIP's line (i.e. nearer the Airship) in order to adjust flow at specific lengths. As the four-way hose is reeled up into the roller trackway by the carousel, it is stopped by a laser trigger (the LADAR positioned at the S-keel measuring the distance between the Airship and Skycrane) and a computer command to the carousel.

Adjacent to the trackway and its bundled four-way hoses, are Syringe/blowers, each cone shaped, mounted to a mechanical arm at a angle above the trackway. When the hose stops, the appropriate Syringe/blow is inserted (at the appropriate angle downward) into the hose's port. Each Syringe/blower is linked by way of flexible hoses to the Airship's helium circulation system and each can shoot helium into the port to reestablish helium pressure and mass flow along the length of each hose. Inserting the blower into a port, forces the interior lining inside the port to press down.

The key to each port's air-tight seal lies in its U shaped lining placed inside each hose. Made of elasticized, springy material, this inverted U-shaped lining is made of a synthetic rubber, such as Neoprene®.

Neoprene® rubber has a springy consistency that makes it notoriously difficult to fold when it deforms. Neoprene® also provides flexibility and a snug fit as a liner inside the hose, and bounces back to its original shape after being compressed. Neoprene® also has a low helium permeability.

When this inverted U shaped liner in used in larger diameter piping, a sturdier synthetic rubber can be used with a Neoprene® top layer. Located along the hose's inner wall for a specified length, this interior lining forms an upside down U, (the top part of the U arcs up into the ellipsoid hole of the port to create a snug fit against its rim in order to provide a pressure seal to prevent the escape of helium.

When the conically shaped syringe/blower is inserted into the port, it depresses the U-shaped liner at one end, and gains entrance to the downstream flow path. This action seals off and closing the hose's upstream flow and opens its downstream flow. Removal of the syringe/blower from the port restores the inverted U-shaped liner to its original shape, sealing its position against the rim of the ellipsoid port and reopening upstream flow. A hard and thin outer strip is attached to the inverted U-shaped liner, at the uppermost point within the port. This narrow strip, no thicker than the port's rim, provides a point of contact for syringe/blower. When the conically shaped syringe/blower enters the port at the designated angle it comes into direct contact with this hard strip. The angle and pressure of this action depresses the inverted U shaped liner, but the neoprene suffers no damage because no direct contact with the syringe/blower occurs. Through this method, the syringe/blower safely positions itself beyond the end of the inverted U shaped liner near the hose's bottom wall to discharge helium down the hose flow path. Upon the syringe/blowers removal, the port's seal is maintained.

Furthermore, any pressure asserted against the port's U shaped liner (other than that caused by the syringe/blower) will not allow helium to escape from the hose. Even during reeling or if the hose is twisted in the air, the hose's Pipe-in-Pipe construction provides enough rigidity to protect the ellipsoid ports from compression and escape of helium.

Manipulation and dynamic control of HE pressurization and depressurization by way of this HE circulatory system, when combined and augmented with a separate system of superheating HE within the Airship, provides optimum buoyancy force, stability and trim and ballast control to effectively control the entire Multibody Aircrane in order conduct payload transfer operations at mean sea level.

High pressure pumps cross no technological barriers and are similar to those pumps in common use at lower pressures. Limiting factors of each pump's capacity is its horsepower needs of its driver which limits output. High unloading rates can be achieved using multiple pumps. Generally, the velocity flow rate of helium increases as its temperature increases, but gas expansion results.

Ultimately, the HE circulation system is regulated, by transfer or lighter than air gas, to meet the cargo lifting requirements for the entire Multibody Aircrane system to perform cargo transfer operations at sea.

NASA'S Software for a Helium Circulatory System

NASA already has fully conceptualized, tested, simulated and developed a general-purpose computer program for analyzing steady state or transient flows in complex networks. It is called "GFSSP Version 3.0."

GFSSP is a generalized fluid system simulation program was developed as a general fluid flow system solver capable of handling phase changes, compressibility, mixture thermodynamics and transient operations. The program also includes the capability to model external body forces such as gravity and centrifugal effects in a complex flow network.

GFSSP was first developed as a generalized fluid flow system solver capable of handling the different physical processes encountered in a typical thermo-fluid system. This reduces analytical costs associated with building specific-purpose analysis tools that have limited applicability. The intent of this effort was to provide an engineer with an undergraduate background in fluid mechanics and thermodynamics to be able to rapidly develop a reliable model.

This advanced NASA software can be used to analyze and integrate the entire Airship/Skycrane HE system (compressed HE circulatory and tempered HE) to show a heat balance system that presents values temperature, pressure, mass flow and HE buoyancy values.

Generalized Fluid System Simulation Program (GFSSP) Version 3.0

GFSSP is capable of modeling phase changes, compressibility, mixture thermodynamics and external body forces such as gravity and centrifugal. The program contains subroutines for computing "real fluid" thermodynamic and thermophysical properties for thirty-three fluids including hydrogen, oxygen, nitrogen, helium, water and kerosene (Rocket Propellant 1).

The GFSSP solution of a flow circuit gives detailed and complete flow field information. It provides the values of all of the relevant variables (such as mass flow rate, velocity, pressure, temperature, density, concentrations, specific heat, viscosity etc.) at all locations of the model and at each instance (time step) during the entire operation (duration of model run). Obviously, no experimental study can be expected to measure the distribution of all variables over the entire circuit for a given period of time. For this reason, even when an actual test is performed, there is a great value in obtaining a GFSSP solution to supplement the test information.

In addition, a graphical user interface, Visual Thermo-fluid dynamics Analyzer for Systems and Component (VTASC), has been developed to facilitate the development of the GFSSP input files. GFSSP has also been successfully integrated with a state of the art thermal analyzer SINDA with the help of an interface.

GFSSP possesses unique capabilities that are currently unavailable in existing commercially available fluid network analysis software. It provides a state of the all fluid network system analysis capability. The capability of GFSSP to handle mixtures, real gas properties, rotating elements, phase changes and external body forces is unique. No other commercially available code can perform the all of the same calculations available in GFSSP. The recent addition of the VTASC graphical user interface has greatly simplified the process of building flow network models. This new feature significantly reduces the time required to construct models by an order of magnitude.

It is now possible to quickly evaluate conceptual designs. The ability to perform higher fidelity analyses will reduce testing required to develop new systems and will minimize hardware failures during development. Cost savings associated with reduced numbers of tests and loss of hardware are substantial.

GFSSP has already made significant technological contributions to various NASA programs and has demonstrated potential as a successful commercial product. NASA has used this software program to support the following projects or missions (as well as non-aerospace commercialization applications): Space Shuttle Main Engine (SSME); High Pressure Oxidizer Turbopump; Secondary Flow Circuit Analysis; Axial Thrust Balance/Secondary Flow Circuit Analysis of the Fastrac (MC-1) Engine Turbopump; Pressurized Propellant Feed System Analysis for the Propulsion Test Article at Stennis Space Center; X-34 Main Propulsion System Analysis; X-33 Reaction Control System and Thermal Protection System Analysis; Shooting Star Experiment Feed System Analysis; Rotodynamic Analysis of the SSME High Pressure Oxidizer Turbopump; Bantum Lifter Purge Analysis and Various Venting Analyses; International Space Station (ISS) Environmental Control and Life Support System design; Integrated Powerhead Demonstrator Test Analysis; ISS Propulsion Module Analysis; MC-1 Engine Test Support Analysis GFSSP requires that the flow network be resolved into nodes and branches. The program's GUI, VTASC, allows the user to interactively develop a fluid network simulation consisting of nodes and branches. In each branch, the momentum equation is solved to obtain the flow rate in that branch. At each node, the conservation of mass, energy and species equations are solved to obtain the pressures, temperatures and species concentrations at that node. The system of equations describing the fluid network is solved by a hybrid numerical method that is a combination of the Newton-Raphson and successive substitution methods. GFSSP Version 3.0 also provides the flexibility to add additional capability through user-supplied subroutines. This feature significantly reduces the need to modify source code to extend code's capability.

This software package works or operates relative to the following system, including subsystems, components, etc.

A fluid flow network consists of a group of flow branches, such as pipes and ducts, that are joined together at a number of nodes. They can range from simple systems consisting of a few nodes and branches to very complex networks containing many flow branches simulating valves, orifices, bends, pumps and turbines. In the analysis of existing or proposed networks, some node pressures and temperatures are specified or known. The problem is to determine all of the unknown nodal pressures, temperatures and branch flow rates.

Nineteen different resistance/source options are provided for modeling momentum sources or sinks in the branches. These options include: pipe flow, flow through a restriction, non-circular duct, pipe flow with entrance and/or exit losses, thin sharp orifice, thick orifice, square edge reduction, square edge expansion, rotating annular duct, rotating radial duct, labyrinth seal, parallel plates, common fittings and valves, pump characteristics, pump power, valve with a given loss coefficient, Joule-Thompson device, control valve and a user specified option.

GFSSP was first successfully used in the design of the MC-1 engine turbopump assembly at Marshall Space Flight Center. Excellent agreement with test results was obtained for both steady state and transient operations. The GFSSP simulation of the Propulsion Test Article helium pressurization system also shows good agreement with test results.

Another cost savings provided by GFSSP is its ability to reduce the amount of testing required during flow system development. In all applications, the cost of a GFSSP run is many orders of magnitude lower than the cost of a corresponding experimental investigation. A computational parametric investigation can be performed with remarkable speed. A designer can study the implications of hundreds of different configurations and choose the optimum design.

This package has been demonstrated by several successful applications of the code by users.

The MSFC Technology Transfer Department worked with Research Triangle Institute (RTI) to explore the commercial feasibility of GFSSP. Two companies are in final stages to procure licensing agreement to commercialize the code. Cullimore & Ring Technologies and Concepts NREC, Inc has been licensed to commercialize this product. Concepts/ NREC has been using this code in one of SBIR program funded by MSFC.

GFSSP first was made fully operational and in use since 1995 in support of the various MSFC programs. GFSSP Version 1.4 was selected for inclusion in NASA's Computer Software Management and Information Center (COSMIC). Original authors were Dr. Alok Kumar Majumdar, NASA/MSFC, 50%, John W. Bailey, Sverdrup, 10%, Paul Allen Schallhorn, Sverdrup, 10%, Todd E. Steadman, Sverdrup, 10%, Saif Warsi, ERC, 10%, Katherine P. VanHooser, NASA/MSFC, 5%, Kimberly Holt, NASA/MSFC, 5%.

Authors Dr. Alok Kumar Majumdar, John W. Bailey, Paul Schallhorn and Todd Steadman developed GFSSP Version 2.01 and received the following awards: Space Act Award; Award for Patent Application; Technical Innovation Award; Award for being Published in NASA Tech Briefs.

GFSSP has appeared as a new invention in NASA Tech Briefs (page 49, January, 2000). NASA/MSFC has filed a patent application (application Ser. No. 09/313,576, dated May 7, 1999). NASA/MSFC is also in the final stages of negotiation with two companies for licensing GFSSP for commercial application.

CONCLUSIONS, RAMIFICATIONS, SCOPE OF INVENTION

The Airship/Skycrane can operate over the entire length of a containership, and its NIST Robocrane rigging carrying Loadframe with payload can extend or react to negotiate freeboard (i.e. the distance from the oil platform or containership's waterline to the upper deck level, measured at the center of the ship) and reach alongside smaller, shallow-keeled cargo ships, it therefore offers far more agile and efficient payload transfer operations.

To date no heavy lift air-crane—as a Lighter-than-Air platform—and has been designed for at sea operation. Nor does any exact category for this invention fit into any existing nomenclature or rubrics. Nor has any major company designed or developed such a VTOL air-based crane for the at-sea material transfer of several hundred tons of payload from ship to ship or from ship to shore, particularly Arctic operations of the Oil & Gas Industry.

This VTOL air-crane, as an integrated semi-autonomous, lighter-than-air multibody system, also provides active ballast control, relative positioning and predictive motion control, to achieve fast-paced and precise point-to-point transfer of very heavy payloads between ships, in order to transfer up to six 53,000-60,000 pound ISO 20' containers or palletized cargo or outsized payloads such as vehicles at once between Panamax, Post-Panamax, or even ultra-large Malacca-max containerships (with high freeboard and low GM) or as well much smaller cargo vessels such as green water crafts or Offshore Supply Vessels (OSVs) underway within a sea lane under random sea states 3, 4, 5. The result is wholly new concept that will produce greater efficiency in oil and gas operations and improve supply chain efficiency by enabling a substantial increase in heavy-lifting capacity.

During payload transfer operations, the throughput rate for equipment, outsized cargo, or container transfers depends upon such conditions as sea state, all multibody speeds and headings, distancing of ships in a sea lane (with or without fenders), size of ships, and targeting and weight of payload for load on and load offs (LO/LO) on decks or deep in holds, etc. But by using this invention, throughput rates could be as high as 795 tons per hour.

These conditions presume a train of transport ships aligned in a sea lane sailing in a following sea, perhaps in a staggered tandem formation, that maintain constant relative speeds and distances to one another and the VTOL air-crane occupying the center of that corridor (sea lane).

The Airship/Skycrane's throughput rate calculation for container transfer is determined by estimating:
Each ISO 20' container weighs approximately 53,000 lbs
53,000 lbs times 6 containers (Loadframe lift capacity)=159 tons per transfer
Transfer time between ships=approximately 12 minutes
1 hour=5 times 12 minutes. Therefore 5 transfers times 159 tons=a throughput rate of 795 tons per hour.

The Airship/Skycrane, a scalable VTOL air-crane, has been designed to perform a new category of sealift: Very Heavy Vertical Replenishment (Very Heavy VERTREP), or transferring at once up to 6 (six) 20' ISO containers between ships underway in a sea lane. But just as a note, this VTOL air-crane can be easily configured to transport customized, smaller palletized cargo or pallet-sized containers. This VTOL air-crane's ability to provide operational reach over the length and breadth of long containerships with high freeboard and low GM or other platform offers better flexibility for high volume VERTREP interoperability with Pananax or Post-Panamax containerships.

Improved Shipboard Cargo Handling: Internal handling of cargo containers or pal lets and vehicles requires automation. Rapid, flexible logistics supply will likely require tailored packages from a robust selective offload system. Increased heavy payload lifting capacity to streamline supply chains through robust throughput capacity. This invention can be configured for speedier and just-in-time delivery of customized packages of high density, the outsized load equivalent to the capacity of several freight cars. Up to 6 (six) ISO 20' containers between ships underway in a sea lane. Structural modifications to sea based ships to account for necessary and new space requirements, to introduce reinforced cargo decks, deck cranes, conveyors, and other desired equipment, could be added in a relatively low cost to allow these ships to perform these very important logistics functions. Use of an Airship/Skycrane improves logistical operations, especially when combined with a modified containership design outfitted with a deck mobile gantry crane(s) running over the entire length and breadth of the containership ship), deck-based conveyers, container shuttle mechanisms, forklifts, rolling equipment, ramps and elevators etc. Granted, many of these ships/platforms are not currently outfitted with gantry cranes to perform such heavy lift payload transfer operations.

But this invention is not exclusively dependent on, "box" operations; it can be used for a plethora of other heavy-lifting tasks, including the transfer of pallatized cargo as well as POL (petroleum, oil, lubricant) and water, outsized packages or cars, trucks, or other vehicles, etc. by hook and sling. It also address the critical LO/LO issue, i.e. during underway payload transfer operations, to achieve the timely and efficient storage and distribution and high throughput rates of very heavy payloads, while at the same time preventing sag/hog of the containership as well as the smaller ship's safe stability and trim. Metacentric height (GM) is a characteristic of a ship's stability in the water. Ship stability relates to its Center of Gravity (G), Center of Buoyancy (B) and Metacenter (M) when a ship upright and heeled over to one side. When G and M are fixed on the centerline of the ship, B moves as the ship heels. The center of buoyancy is the center of gravity of the volume of water which the hull displaces. These stability and trim factors influence heavy payload handling within and between ships underway in a sea lane and have not been adequately addressed. Another clear advantage of the Airship/Skycrane/Loadframe design, besides creating high throughput rates for a Panamax or Post Panamax ship, is to help address the structural bending problem of sag/hog associated with these excessively large ships during underway at-sea material transfer of payloads, LO/LO operations.

Planning and management of throughput capacity and supply chains are improved by the Airship/Skycrane. Using the Airship/Skycrane, allows precise point-to-point transfer of very heavy oversized cargoes or containers between underway ships within a sea lane. Use of this VTOL air-crane at a sea base increases lean logistics efficiency and throughput rates and reduces storage and warehousing times—resulting in better inventory control RFID management and tighter security: Security cost go down. Cargoes and materials can be quickly broken down directly from containerships and delivered more cheaply and faster to markets, in higher volumes with greater precision and efficiency. When combined with sophisticated operations research (OR) analysis and RFID technology, however, this invention can help make container supply chains more flexible.

Because the Airship/Skycrane incorporates the adjustable NIST Robocrane system to carry in its rigging the "Soft-Landing Mechanism" Loadframe with payload, it can vertically negotiate the freeboard (i.e. the distance from the waterline to the upper deck level, measured at the center of the ship) and reach alongside these large containerships and smaller cargo ships, it offers far more efficient cargo transfer operations.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

I claim:

1. A multibody aircrane comprising:
   a fuselage;
   a delta wing, the delta wing having a hull;
   a tether control line; the tether control line being connected to the fuselage and the delta wing; and
   a cable suspension system, the cable suspension system being centered on the hull of the delta wing, wherein the cable suspension system attaches to:
   a hook block, a hook block and slung payload, or a hook block and suspended loadframe.

2. The multibody aircrane of claim 1 wherein the fuselage further comprises:
   a first plurality of fabric tubes, the tubes forming a skeleton, and the tubes being filled with high-pressure air;
   an envelope, the envelope surrounding the skeleton, and the envelope providing a smooth aerodynamic surface; and
   a S keel, the S keel being positioned at an aft end of the fuselage under the envelope, and the S keel being formed from a second plurality of fabric tubes.

3. The multibody aircrane of claim 2 wherein the first plurality of tubes and the second plurality of tubes are made of a high strength, seamless, braided polymer fiber.

4. The multibody aircrane of claim 2 wherein the envelope of the fuselage is made of a high molecular weight polyethylene fabric material, the material having a tensile strength of about 2000 pounds and a scrim weight of about 15 ounces of yarn per square yard.

5. The multibody aircrane of claim 2 further comprising a load patch, the load patch being seamed and bonded to the envelope, the load patch being made of carbon fiber, wherein the load patch insulates a central, topside section of the fuselage, wherein the load patch is an ovoid, polycentric curve in shape.

6. The multibody aircrane of claim 1 further comprising a tether reel and winch mechanism, the tether reel and winch mechanism being centrally positioned on the fuselage along the S keel above a bridle point for the tether control line.

7. The multibody aircrane of claim 1 wherein the delta wing further comprises:
   a third plurality of fabric tubes, the tubes forming a skeleton, and the tubes being filled with high-pressure air;
   an envelope, the envelope surrounding the skeleton, and the envelope providing a smooth aerodynamic surface;
   an internal spiral system of inflatable tubes; the tubes being filled alternately with compressed and uncompressed helium.

8. The multibody aircrane of claim 7 wherein the third plurality of tubes are made of a high strength, seamless, braided polymer fiber.

9. The multibody aircrane of claim 7 wherein the envelope of the delta wing is made of a high molecular weight polyethylene fabric material.

10. The multibody aircrane of claim 1 further comprising a forced helium circulatory system wherein compressed and non-compressed flow is employed between the fuselage and the delta wing to provide ballast control for the delta wing.

11. The multibody aircrane of claim 1 wherein the loadframe is a rectangular box having an open tubular frame and an open bottom with an inflatable bag system is disposed within the loadframe, the inflatable bag system providing a cushion for a payload.

12. The multibody aircrane of claim 1 further comprising a plurality of air blowers to provide air to the inflatable bag system.

13. The multibody aircrane of claim 1 further comprising a ramp system at a base of the loadframe.

14. The multibody aircrane of claim 1 further comprising a power and propulsion system, the power and propulsion system being selected from the group consisting of: turbo jet engines, air jet engines, thermo-acoustic engines, and a combination thereof.

15. The multibody aircrane of claim 1 further comprising a flight control system, wherein the flight control system further comprises control, navigation, and diagnostic subsystems, the control, navigation, and diagnostic subsystems further comprising microprocessors, sensors, and actuators.

16. The multibody aircrane of claim 1 wherein the fuselage and the delta wing are coupled together to conduct low altitude, high speed, subsonic forward flight.

17. The multibody aircrane of claim 1 wherein the fuselage and the delta wing are decoupled, but linked by the tether control line to conduct low speed, low altitude flight.

* * * * *